United States Patent
Matsunaga et al.

(12)
(10) Patent No.: US 6,303,280 B1
(45) Date of Patent: Oct. 16, 2001

(54) TRANSPARENT MAGNETIC RECORDING MEDIUM

(75) Inventors: Naohiro Matsunaga; Tsutomu Arai; Tomokazu Yasuda, all of Minami-ashigara (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/576,804

(22) Filed: May 23, 2000

(51) Int. Cl.$^7$ .............................. G03C 1/76; C11D 17/00; G11B 23/00; G11B 5/74; B05D 5/12

(52) U.S. Cl. .................... 430/496; 430/140; 430/523; 430/531; 430/961; 360/131; 360/134; 427/131; 428/900; 508/450; 508/451

(58) Field of Search ............................ 430/523, 140, 430/531, 961, 496; 428/900; 427/131; 360/131, 134; 508/450, 451

(56) References Cited

U.S. PATENT DOCUMENTS

| | | | |
|---|---|---|---|
| 5,436,120 | * | 7/1995 | Wexler et al. ................ 430/523 |
| 5,541,048 | * | 7/1996 | Whitesides et al. ........... 430/523 |
| 5,747,234 | * | 5/1998 | Wexler et al. ................ 430/523 |
| 5,776,668 | * | 7/1998 | Oltean et al. ................. 430/140 |
| 5,798,136 | * | 8/1998 | Landry-Coltrain et al. ... 430/523 |
| 5,843,631 | * | 12/1998 | Mihayashi et al. ............ 430/140 |
| 6,048,677 | * | 4/2000 | Chen et al. ................... 430/523 |

FOREIGN PATENT DOCUMENTS

A7219091   8/1995   (JP) .

* cited by examiner

Primary Examiner—Richard L. Schilling
(74) Attorney, Agent, or Firm—Birch, Stewart, Kolasch & Birch, LLP

(57) ABSTRACT

There is disclosed a transparent magnetic recording medium comprising at least one magnetic recording layer containing ferromagnetic particles, on a support, wherein an overcoat solution which comprises at least one kind of lubricant wax dispersion and at least one kind of anionic surfactant in an amount of 0.1% to 30%, based on the total weight of the lubricant wax dispersion, is coated on the at least one magnetic recording layer. There is also disclosed a silver halide photographic light-sensitive material having the transparent magnetic recording layer. The transparent magnetic recording medium can exhibit both a good state of coated surface and secure magnetic input/output performance. The silver halide photographic light-sensitive material can provide a silver halide photographic light-sensitive material having the transparent magnetic recording layer with the above-described property.

20 Claims, No Drawings

TRANSPARENT MAGNETIC RECORDING MEDIUM

FIELD OF THE INVENTION

The present invention relates to a transparent magnetic recording medium, which is excellent in a state of coated surface and magnetic input/output performance.

BACKGROUND OF THE INVENTION

A magnetic recording layer of a magnetic recording medium, such as an audiotape, a videotape, and a floppy disc, contains a high content (coated amount) of magnetic substance, which results in lack of light-permeability, even though high magnetic output (reading) capability can be attained. Consequently, the above-described magnetic recording layer techniques cannot be applied, as it is, onto the printing surface of a magnetic card or onto a photographic film. U.S. Pat. No. 5,491,051 describes photographic elements that exhibit excellent magnetic and photographic characteristics, and that are capable of repeated use.

A difficulty, however, arises for these photographic elements. That is, the photographic elements are not satisfactorily reliable in recording or reading of incorporated magnetic recording various information when incorporated magnetic recorded information is used repeatedly or used as conditions for development or printing. Such incorporated magnetic recording information utilized includes the date of photographing, weather, conditions for illumination, conditions at the time of photographing (e.g. the ratio of reduction to enlargement), the number of leaves for reprinting, an area to be zoomed, and some messages. Further, transparent magnetic layer-related techniques are described in JP-A-4-214217 ("JP-A" means unexamined published Japanese patent application), JP-A-6-161033, U.S. Pat. Nos. 5,496,687, 5,432,050, 5,436,120, and U.S. Pat. No. 5,434,037.

Practically, for example, when a transparent magnetic recording medium is also given a function as a photographic element (photographic light-sensitive material), dirt substances (hereinafter referred to as dirt) easily deposit on a magnetic head. The dirt is mainly composed of a dried solid of the developing solution, and it is very adhesive to things. The above-described adhesive dirt, which is not usually formed for an ordinary magnetic recording medium, becomes adhered to and deposits on a magnetic head from the medium, to make the precise contact of a magnetic layer with the head considerably deteriorated. Further, so-called spacing loss occurs by the dirt, which results in an error in reading of the magnetic recorded information. Even if alumina abrasives, which are used for an ordinary magnetic recording medium, are used to clean the head dirtied, the dried solid of the developing solution cannot be sufficiently prevented from adhering onto the magnetic head in a conventional method. Further, when the amount of the alumina abrasives to be used is increased, or a larger particle of alumina abrasives is used, a new problem arises. Dirt-removal is not improved sufficiently, and undesirably the transparency of the medium extremely decreases, which is disadvantageous to photographic use, and the life (duration) of the magnetic head is drastically shortened.

Further, in order to remove deposited dirt owing to dried-up ingredients of a developing solution, it is known to coat an overcoat solution containing particles onto the surface of a magnetic recording medium. In this case, in order to incorporate spherical particles in the overcoat solution and to hold them in a magnetic recording layer as an underlayer (i.e. a layer below the overcoat layer), it is necessary to incorporate, in the overcoat solution, a solvent that is able to dissolve the underlayer. However, at the time of coating the overcoat solution, interaction (aggregation) between a binder, which is dissolved into the solvent out of the underlayer, and a lubricant wax dispersion incorporated in the overcoat solution, occurs, and consequently the state of coated surface deteriorates. Particularly, in order to sufficiently bury spherical particles into the underlayer, it is necessary to increase the ratio of the solvent employed to dissolve the underlayer, but the tendency of occurrence of such as the above-mentioned problems is becoming stronger. Thus, if the state of coated surface deteriorates, not only is the appearance of the product made worse, but also contact (hit) with a magnetic head becomes uneven, so that fundamental characteristics (electromagnetic conversion characteristics) of the magnetic recording medium are affected badly. Accordingly, there is a need to improve the above-mentioned problems.

SUMMARY OF THE INVENTION

That is, an object of the present invention is to provide a transparent magnetic recording medium that excels in the state of coated surface (no unevenness in appearance), and that exhibits excellent magnetic input/output performance.

Other and further objects, features, and advantages of the invention will appear more fully from the following description.

DETAILED DESCRIPTION OF THE INVENTION

The above-described object of the present invention has been attained by the following magnetic recording mediums and light-sensitive material.

(1) A transparent magnetic recording medium comprising at least one magnetic recording layer containing ferromagnetic particles, on a support, wherein an overcoat solution which comprises at least one kind of lubricant wax dispersion and at least one kind of anionic surfactant in an amount of 0.1% to 30%, based on the total weight of the lubricant wax dispersion, is coated on the at least one magnetic recording layer.

(2) A silver halide photographic light-sensitive material having the transparent magnetic recording layer as stated in the above (1).

As preferable embodiments of the present invention, in addition to the above, the following magnetic recording mediums and light-sensitive material can be mentioned.

(3) The transparent magnetic recording medium as stated in the above (1), wherein the lubricant wax dispersion is a higher fatty acid ester-lubricant dispersion.

(4) The transparent magnetic recording medium as stated in the above (1) or (3), wherein the anionic surfactant is allowed to be previously adsorbed on the surface of the dispersed wax lubricant in the lubricant wax dispersion solution.

(5) The transparent magnetic recording medium as stated in any one of the above (1), (3), or (4), wherein the overcoat solution comprises at least one kind of spherical inorganic particles having a Mohs' hardness of 6 to 8 and/or at least one kind of spherical organic high-molecular particles.

(6) The transparent magnetic recording medium as stated in any one of the above (1), (3), (4), or (5), wherein the wax lubricant is previously dispersed by a solvent comprising cyclohexanone and the overcoat solution contains at least diacetone alcohol (DAA) as its solvent and the binder of the magnetic recording layer is diacetyl cellulose (DAC).

(7) The transparent magnetic recording medium as stated in any one of the above (1), (3), (4), (5), or (6), wherein the transparent magnetic recording layer contains inorganic particles having an average primary particle size of from 1 nm to 50 nm in an amount of from 10 mg/m² to 200 mg/m².

(8) The transparent magnetic recording medium as stated in any one of the above (1), (3), (4), (5), (6), or (7), wherein the transparent magnetic recording layer contains alumina abrasives having substantially higher particle size than the any average height of the surface protrusion of said spherical inorganic particles and said spherical organic high-molecular particles.

(9) A silver halide photographic light-sensitive material having the transparent magnetic recording layer as stated in any one of the above (3) to (8), which comprises at least one light-sensitive silver halide emulsion layer provided on one side of a support opposite to the transparent magnetic recording layer.

It is effective to locate, at the surface of the medium, spherical inorganic particles having a Mohs' hardness of 6 to 8, preferably monodispersed amorphous (noncrystalline) silica particles or titanium oxide particles, to remove the dirt that is formed when a transparent magnetic recording medium is to be used as a photographic element, in the present invention. The above particles not only prevent dirt of a developing solution, which materials are adhered on the surface of a magnetic recording medium, from coming in contact with a magnetic head, the particles can also remove extremely high-adhesive dirt from the magnetic head.

The spherical inorganic particles having a Moh's hardness of 6 to 8, can be distributed extremely uniformly in the surface of a magnetic recording layer, by a method comprising incorporating the spherical inorganic particles in an overcoat solution containing a wax lubricant, which solution will be coated on a magnetic recording layer already applied to a support, and then dissolving the underlying magnetic recording layer with a solvent of the overcoat solution. Thus, the spherical inorganic particles in the magnetic recording layer are buried partially, without employing a method of including the spherical inorganic particles in the underlying magnetic recording layer. Such uniform distribution (uniformity of a projecting height) makes the amount of the inorganic particles to be used so small that transparency can be greatly improved. On the other hand, organic high-molecular particles are also useful as a spherical particle that has the same function to prevent dirt from coming contact with a magnetic head. Even though they are inferior to the spherical inorganic particles having a Moh's hardness of 6 to 8, in terms of ability to clean highly adhesive dirt of a developing solution, organic high-molecular particles do not lower the lubricating efficiency of the medium. Further, the use of the above-mentioned spherical inorganic particles in combination with the above-mentioned spherical organic high-molecular particles is most effective for providing a silver halide photographic light-sensitive material with an excellent transparent magnetic recording medium.

The lubricant wax dispersion is obtained by properly dispersing a wax lubricant in a solvent. The concentration of a wax lubricant in the dispersion, even though it is not limited in particular, is preferably 3 to 30 wt. %, more preferably 5 to 15 wt. %. Next, a wax lubricant for use in the present invention is described. The term "a wax lubricant" herein used means a compound which is solid at a room temperature and which has a long chain hydrocarbon group.

Examples of the compound include hydrophobic hydrocarbon compounds such as paraffin wax and carnauba wax, and compound having a hydrophilic group in addition to the long chain hydrocarbon group, such as a long chain aliphatic carboxylic acid and a long chain aliphatic carboxylic acid amide. Of these compounds, particularly preferred are higher fatty acid ester-lubricants which give a sufficient lubrication property and scratch-resistance.

Next, the higher fatty acid ester lubricant for use in the present invention is described in detail.

Examples of known esters include higher fatty acid esters (esters obtained from fatty acids having 10 to 24 carbon atoms and alcohols having 10 to 24 carbon atoms) as disclosed in JP-B-58-33541 ("JP-B" means examined published Japanese patent application), British patent 927,446, JP-A-55-126238, and JP-A-58-90633; esters obtained from straight-chain higher fatty acids and straight-chain higher alcohols as disclosed in JP-A-58-50534. Further, esters containing a branched alkyl group, which are obtained from higher fatty acids and higher alcohols can be also preferably used.

Long chain alkyl compounds, as represented by formulae (1) and (2), are preferred as the wax lubricant, on account that sufficient lubrication property and scratch-resisting property are obtained both before and after the development.

$$R^1X^1R^2 \quad \text{Formula (1)}$$

$$R^3X^2R^4X^3R^5 \quad \text{Formula (2)}$$

In formula (1), $R^1$ and $R^2$ each independently represent an aliphatic hydrocarbon group. It is necessary that the total carbon atoms of these compounds are from 25 to 120. The total carbon atoms 25 or more are necessary to obtain sufficient lubrication property. Further, when the total carbon atoms are over 120, a solubility to an organic solvent becomes poor, so that application by a dispersion and/or a coating becomes difficult. The total carbon atoms are more preferably from 30 to 100, and further more preferably from 40 to 80. Further $R^1$ and $R^2$ each are preferably an aliphatic hydrocarbon group having 10 to 70 carbon atoms, which is able to provide sufficient scratch-resisting property and to control a deterioration of the lubrication property under various conditions in the practical use. On the other hand, when the number of carbon atoms is 10 or less, the scratch-resisting property becomes worse, and a deterioration of the lubrication property occurs due to transfer of a lubricant under various conditions in the particle use. Further, an aliphatic compound having 70 or more carbon atoms with one terminal modified by a functional group, generally has not been known, except for especially synthesized materials. Such an aliphatic hydrocarbon group may be a straight-chain structure, may have an unsaturated bond, may have a substituent, or may have a branched-chain structure. Of these hydrocarbon groups, those having a straight-chain structure are especially preferred from a view point of the scratch-resisting property. Each of $R^1$ and $R^2$ more preferably has 15 to 50 carbon atoms.

In formula (2), $R^3$, $R^4$ and $R^5$ each independently represent an aliphatic hydrocarbon group. It is necessary that the total carbon atoms of the compound are from 30 to 150. The total carbon atoms of 30 or more are necessary to obtain a sufficient lubrication property. Further, when the total carbon atoms are over 150, a solubility to an organic solvent becomes poor, so that application by a dispersion and/or a coating becomes difficult. The total carbon atoms are more preferably from 40 to 130, and further more preferably from 50 to 120. Further, $R^3$ and $R^5$ each are preferably an aliphatic hydrocarbon atom having 10 to 70 carbon atoms, and $R^4$ is preferably an aliphatic hydrocarbon group having 10 to 50 carbon atoms, because these groups are able to provide a sufficient scratch-resisting property and to control a deterioration of the lubrication property under various conditions in the practical use. When the number of carbon atoms of $R^3$ and $R^5$ is 10 or less, the scratch-resisting property becomes worse, and a deterioration of the lubrication properly occurs due to transfer of a lubricant under various conditions in the practical use. Further, an aliphatic compound having 70 or more carbon atoms with one terminal modified by a functional group, generally has not been known, except for especially synthesized materials. Such an aliphatic hydrocarbon group may be a straight-chain structure, may have an unsaturated bond, may have a substituent, or may have a branched-chain structure. Of these hydrocarbon groups, those having a straight-chain structure are especially preferred from a view point of the scratch-resisting property. The number of carbon atoms of $R^3$ and $R^5$ is especially preferably from 15 to 50. Further, when the number of carbon atoms of $R^4$ is 10 or less, the scratch-resisting property becomes worse, and a deterioration of the lubrication property occurs due to transfer of a lubricant under various conditions in the practical use. Further, an aliphatic compound having 50 or more carbon atoms with both terminals modified by functional groups, generally has not been known, except for especially synthesized compounds. These aliphatic hydrocarbon groups also may be a straight-chain structure, may have an unsaturated bond, may have a substitute, or may have a branched-chain structure. Of these hydrocarbon groups, those having a straight-chain structure are especially preferred from the view point of the scratch-resisting property. The number of carbon atoms of $R^4$ is more preferably from 12 to 25.

Further, in formulae (1) and (2), $X^1$, $X^2$ and $X^3$ each represent a divalent linking group. Specific examples of the divalent linking group include —OC(O)—, —C(O)O—, —C(O)NR—, —SO$_3$—, —OSO$_3$—, —SO$_2$NR—, —O—, and —OC(O)NR—, wherein R represents H, or a saturated aliphatic hydrocarbon group having 8 or less carbon atoms.

Specific examples of the compounds represented by the above-mentioned formulae (1) and (2) are illustrated below.

n-C$_{15}$H$_{31}$COOC$_{30}$H$_{61}$-n  (1-1)

n-C$_{17}$H$_{35}$COOC$_{40}$H$_{81}$-n  (1-2)

n-C$_{15}$H$_{31}$COOC$_{50}$H$_{101}$-n  (1-3)

n-C$_{27}$H$_{43}$COOC$_{28}$H$_{57}$-n  (1-4)

n-C$_{21}$H$_{43}$COOCH$_2$CH(CH$_3$)—C$_9$H$_{19}$  (1-5)

n-C$_{21}$H$_{43}$COOC$_{24}$H$_{49}$-iso  (1-6)

n-C$_{29}$H$_{49}$OCO(CH$_2$)$_2$COOC$_{24}$H$_{49}$-n  (2-1)

n-C$_{18}$H$_{37}$OCO(CH$_2$)$_4$COOC$_{40}$H$_{81}$-n  (2-2)

n-C$_{18}$H$_{37}$OCO(CH$_2$)$_{18}$COOC$_{18}$H$_{37}$-n  (2-3)

iso-C$_{24}$H$_{49}$OCO(CH$_2$)$_4$COOC$_{24}$H$_{49}$-n  (2-4)

n-C$_{40}$H$_{81}$OCO(CH$_2$)$_2$COOC$_{50}$H$_{101}$-n  (2-5)

n-C$_{17}$H$_{35}$COO(CH$_2$)$_6$OCOC$_{17}$H$_{35}$-n  (2-6)

n-C$_{21}$H$_{43}$COO(CH$_2$)$_{18}$OCOC$_{21}$H$_{43}$-n  (2-7)

iso-C$_{23}$H$_{47}$COO(CH$_2$)$_2$OCOC$_{23}$H$_{47}$-n  (2-8)

iso-C$_{15}$H$_{31}$COO(CH$_2$)$_6$OCOC$_{21}$H$_{43}$-n  (2-9)

More preferred lubricants are compounds represented by the above-mentioned formulae (1) and (2) wherein at least one of $R^1$ and $R^2$, or at least one of $R^3$, $R^4$, and $R^5$ has a polar substituent. The term "a polar substituent" herein referred to means a hydrogen bond-forming group, or an ionic dissociative group. The polar substituting for use in the present invention is not limited in particular, but preferable examples thereof include —OH, —COOH, —COOM, —NH$_2$, —NR$_3^+$A$^-$, and —CONH$_2$, wherein M represents a cation such as an alkali metal (e.g. Na, K, and Li), an alkaline earth metal (e.g. Ca and Mg), and a quaternary ammonium salt, R represents H, or a saturated aliphatic hydrocarbon group having 8 or less carbon atoms, and A$_-$ represents an anion such as an anion of halogen atom (e.g. Cl and F). Further, of these groups, —OH is particularly preferred. Optional numbers of the polar substituent may be incorporated in a molecule.

The use amount of a lubricant represented by formula (1) or (2), is not restricted in particular. However, when the spherical inorganic particles coexist, the amount of lubricant to be used is preferably 0.01 to 0.1 g/m$^2$, more preferably 0.02 to 0.07g/m$^2$, furthermore preferably 0.03 to 0.05 g/m$^2$ so as to reveal a sufficient lubrication property and scratch-resistance. Specific examples of the lubricant are illustrated below. However, the present invention is not restricted thereto.

HOCO(CH$_2$)$_{10}$COOC$_{21}$H$_{43}$  (3-1)

C$_{17}$H$_{35}$COOCH$_2$CH(OH)C$_{12}$H$_{25}$  (3-2)

C$_9$H$_{19}$C(OH)(C$_9$H$_{19}$)CH$_2$COOC$_{25}$H$_{51}$  (3-3)

C$_6$H$_{13}$CH(OH)(CH$_2$)$_{10}$COOC$_{40}$H$_{61}$  (3-4)

C$_{14}$H$_{29}$CH(NH$_2$)COO(CH$_2$)n CH(CH$_3$)—(CH$_2$)m—CH$_3$ (n+m=15)  (3-5)

CH$_3$(CH$_2$)$_2$CH(COONa)(CH$_2$)$_6$COOC$_{40}$H$_{81}$  (3-6)

HOCH$_2$(CH$_2$)$_6$CH(OH)CH(OH)(CH$_2$)$_4$COO—C$_{50}$H$_{101}$  (3-7)

C$_{17}$H$_{33}$COO(CH$_2$)$_{16}$OH  (3-8)

CH$_3$(CH$_2$)$_2$CH(OH)(CH$_2$)$_6$CONHC$_{21}$H$_{42}$  (3-9)

C$_7$H$_{15}$-ø-COOCH(CONH$_2$)C$_{16}$H$_{33}$  (3-10)

C$_{27}$H$_{55}$COOCH$_2$CH(OH)CH$_2$OH  (3-11)

HOCO(CH$_2$)$_5$COOC$_{40}$H$_{81}$  (3-12)

CH$_3$(CH$_2$)$_{15}$CH(SO$_3$Na)COOCH$_2$CH(C$_{13}$H$_{27}$)—C$_{10}$H$_{21}$  (3-13)

C$_{14}$H$_{29}$CHCOO(CH$_2$)$_5$OCOCH(OH)C$_{14}$H$_{29}$  (4-1)

C$_{10}$H$_{21}$COOCH(C$_2$H$_5$)(CH$_2$)$_7$CH(C$_2$H$_4$COOH)—OCOC$_{10}$H$_{21}$  (4-2)

NaOCO (CH$_2$)$_{11}$COO(CH$_2$)$_{10}$OCO(CH$_2$)$_{11}$—COOH  (4-3)

C$_9$H$_{19}$C(OH)(C$_9$H$_{19}$)CH$_2$COO(CH$_2$)$_{15}$CONH—C$_{10}$H$_{21}$  (4-4)

H$_2$NCO(CH$_2$)$_{10}$COOCH(C$_6$H$_{13}$)(CH$_2$)$_{10}$COO—C$_{30}$H$_{61}$  (4-5)

C$_{14}$H$_{29}$CH(N$^+$(CH$_3$)$_4$Cl$^-$)COO(CH$_2$)$_{10}$OCO—C$_{17}$H$_{33}$  (4-6)

C$_6$H$_{13}$CH(OH)(CH$_2$)$_{10}$COO(CH$_2$)$_8$OCO—(CH$_2$)$_{10}$CH(OH)C$_6$H$_{13}$  (4-7)

C$_{15}$H$_{31}$COOCH$_2$CH(OH)CH$_2$OCOC$_{15}$H$_{31}$  (4-8)

C$_{40}$H$_{81}$OCO(CH$_2$)$_5$COO(CH$_2$)$_5$COOH  (4-9)

$$CH_3(CH_2)_{15}CH(SO_3Na)COO(CH_2)_2CH(CH_3)-(CH_2)_2OCOC_{17}H_{35} \quad (4\text{-}10)$$

$$HOCH_2CH(OH)CH_2OC(CH_2)_3CH(C_2H_5)-(CH_2)_9COOC_{50}H_{101} \quad (4\text{-}11)$$

$$C_8H_{17}NHCO(CH_2)_{10}COO(CH_2)_{15}OH \quad (4\text{-}12)$$

Because the compounds represented by the above-mentioned formulae have a high hydrophobic property, many of them have a poor solubility to a solvent. Therefore, there are available a method for dissolving a compound in a non-polar organic solvent such as toluene and xylene, or a method for dispersing a compound in a coating solution. Of these methods, the dispersion method is preferred because the non-polar organic solvent is difficult to handle. At this time, any kind of dispersing agents may be used, unless they deteriorate a lubrication property and a scratch-resisting property. Preferable examples of the dispersing agent include compounds represented by formula (3) described below.

$$R^6YBD \quad \text{Formula (3)}$$

In formula (3), $R^6$ represents an aliphatic hydrocarbon group having from 25 to 70 carbon atoms. The hydrocarbon group may have an unsaturated bond, may have a various kind of substituents, or may contain a branched structure. A straight-chain aliphatic hydrocarbon group is particularly preferred for the lubrication property and the scratch-resisting property. The number of carbon atoms of the hydrocarbon group is preferably from 25 to 70. In the case of the hydrocarbon group having less than 25 carbon atoms, such problems arise that a sufficient lubrication property and scratch-resisting property is hardly revealed, and that the lubrication property is deteriorated after a processing. Further, as a hydrocarbon compound having 70 or less carbon atoms with one terminal modified by a functional group, are known long-chain aliphatic alcohols having straight- or branched-chain, and the like. However, almost none of compounds having more than 70 carbon atoms generally have been known, except for especially synthesized materials. Particularly preferred carbon atom numbers are from 30 to 60.

Further, Y represents a divalent linking group or a single bond. Specific examples thereof include —C(O)O—, —OCO—, —C(O)NR'—, —NR'CO—, —SO$_2$NR'—, —NR'SO$_2$—, —O—, —S—, —NR—, —OCOR"COO—, and —OCOR"O—, wherein R' represents H or a saturated aliphatic hydrocarbon group having 8 or less carbon atoms, and R" represents a hydrogen atom or a saturated aliphatic hydrocarbon group having from 1 to 8 carbon atoms.

Further, B is composed of any one of the units consisting of —(CH$_2$CH$_2$O)$_a$—, —(CH$_2$CH(OH)CH$_2$O)$_b$—, —((CH$_2$)$_c$CH(R)CH$_2$O)$_d$—, —(CH$_2$CH$_2$O)$_e$—(CH$_2$CH(OH)CH$_2$O)$_f$—((CH$_2$)$_c$CH(R)CH$_2$O)$_g$—, and —(CH(R)CH$_2$O)$_h$—, wherein the all subscripts a to h each represent an integer, a is from 3 to 40, each of b and d is from 3 to 30, c is from 1 to 3, e is from 0 to 40, each of f, g, and h is from 0 to 30, e+f+g is from 3 to 40, and R represents H, CH$_3$, —OH, or a phenyl group. When the length of these nonionic groups is shorter than the above-described range, a sufficient solubility of the lubrication agent, or a sufficient dispersion stability thereof in the case of the dispersion, is hardly attained. On the other hand, when the length thereof is longer than the above-described range, such problems arise that a sufficient lubrication property and scratch-resisting property is not revealed, and that a deterioration of the lubrication property with the lapse of time after a processing occurs. Of these nonionic groups, —(CH$_2$CH$_2$O)$_a$— is particularly preferred, wherein a is preferably from 5 to 30. D represents an end (terminal) group such as a hydrogen atom and an alkyl group.

These polyether-containing compounds can be easily synthesized by, for example, a successive addition reaction of the corresponding higher alcohol with an ethylene oxide according to an ordinary method, or a dehydration condensation of the corresponding dicarboxylic acid with the above-mentioned higher alcohol polyether adduct, or a condensation of the above-mentioned higher alcohol polyether adduct with a higher carboxylic acid.

Molar ratio of the dispersing agent represented by formula (3) to the higher fatty acid ester-lubricant represented by formula (1) or (2), is preferably from 1:9 to 9:1, and preferably from 6:4 to 2:8. Further, a dispersion method of the lubricant is described later.

The particle size of the dispersed lubricant is preferably 0.1 μm to 100 μm, more preferably from 0.1 μm to 10 μm, further more preferably from 0.1 μm to 2 μm. If the particle size of the dispersion is too large, dissolution and melt gluing of the wax due to heat at the drying zone after coating becomes insufficient. Therefore, such a large particle size is not preferable from the viewpoint of giving an even lubrication property to the surface of a medium.

Specific examples of the compounds represented by formula (3) are shown below.

$$n\text{-}C_{30}H_{61}O(CH_2CH_2O)_{10}H \quad (5\text{-}1)$$

$$n\text{-}C_{40}H_{81}O(CH_2CH_2O)_{15}H \quad (5\text{-}2)$$

$$n\text{-}C_{50}H_{101}O(CH_2CH_2O)_{16}H \quad (5\text{-}3)$$

$$n\text{-}C_{50}H_{101}O(CH_2CH_2O)_{30}H \quad (5\text{-}4)$$

$$n\text{-}C_{40}H_{81}O(CH_2CH_2O)_{10}H \quad (5\text{-}5)$$

$$n\text{-}C_{50}H_{101}(CH_2CH_2O)_{16}H \quad (5\text{-}6)$$

$$n\text{-}C_{50}H_{101}-(CH(CH_3)CH_2O)_3(CH_2CH_2O)_{16}H \quad (5\text{-}7)$$

$$n\text{-}C_{50}H_{101}-(CH_2CH(OH)CH_2O)_3-(CH(OH)CH_2O)_3-(CH_2CH_2O)_{15}H \quad (5\text{-}8)$$

$$n\text{-}C_{40}H_{81}OCOCH_2CH_2COO(CH_2CH_2O)_{18}H \quad (5\text{-}9)$$

$$n\text{-}C_{50}H_{101}OCOCH=CHCOO(CH_2CH_2O)_{16}H \quad (5\text{-}10)$$

$$n\text{-}C_{50}H_{101}OCOCH_2CH_2COO-(CH_2CH(OH)CH_2O)_3-(CH_2CH_2O)_{15}H \quad (5\text{-}11)$$

The above-described method made it possible to dispersion-stabilize, in an organic solvent, a lubricant wax dispersion including a dispersion of a higher fatty acid ester-based lubricant. Further, in order to prevent aggregation with a binder of the under layer, it is preferable that the lubricant wax dispersion is subjected to a surface modification (surface treatment) with an anionic surfactant.

An anionic surfactant which is incorporated in an overcoat solution is described below.

As the anionic surfactant for use in the present invention, any ordinary anionic surfactant can be used. The amount of the anionic surfactant to be used is generally 0.1 wt. % to 30 wt. %, preferably 0.2 to 10 wt. %, more preferably 0.5 wt. % to 5 wt. %, based on the total weight amount of the lubricant wax dispersion. If the amount of the anionic surfactant is excessive, a lubrication effect which is provided by a lubricant, unpreferably reduces. Specific examples of the anionic surfactant for use in the present invention are shown below. However, the present invention should not be construed as being restricted thereto.

6-1
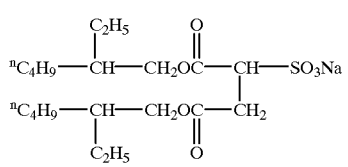

6-2
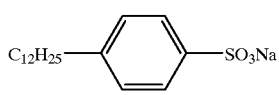

6-3
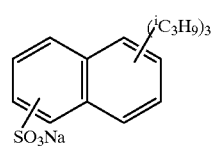

6-4
$^nC_{12}H_{25}OSO_3Na$ 6-5
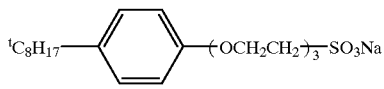

6-6
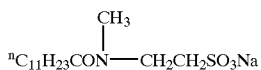

6-7
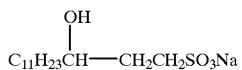
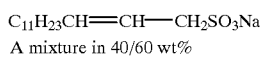
A mixture in 40/60 wt%

6-8
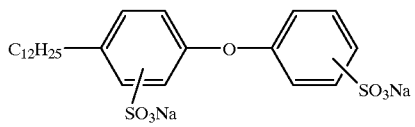

6-9
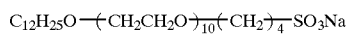

6-10
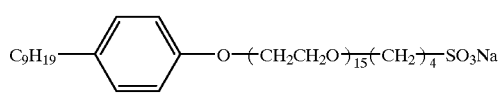

6-11
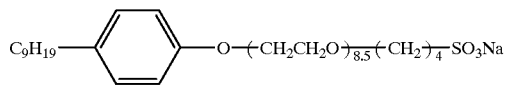

6-12
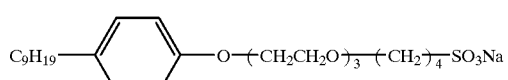

6-13
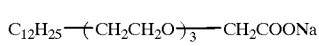

6-14
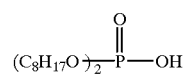

6-15
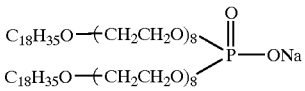

The above-described anionic surfactant, after directly adding it to a wax lubricant distribution solution and previously adsorbing it on the surface of the dispersed lubricant, is preferably added to an overcoat solution with the lubricant dispersion, from the viewpoint that even a small amount of the surfactant to be used effects. An anionic surfactant having a sulfonic acid ($SO_3^-$) is especially preferred in terms of such effects.

Next, the spherical inorganic particles having a Mohs' hardness of 6 to 8 for use in the present invention are described in detail.

Silica (silicon dioxide) and titanium dioxide are exemplified as the spherical inorganic particles having a Mohs' hardness of 6 to 8 for use in the present invention in order to effectively remove, from a magnetic head, a very highly adhesive and cumulative dirt such as a dried solid of the developing solution. The particles having a Mohs' hardness of less than 6 are of a low ability to remove the above-described highly adhesive dirt. On the other hand, the particles having a Mohs' hardness of 9 or more (e g., α-alumina particles) excessively abrades the magnetic head and shorten a life of the head, so that a large amount of the particles can not be used. Therefore, these particles are excluded from the group of the inorganic particles for use in the present invention. However, a small amount of the α-alumina particles is preferably used in a magnetic recording medium of the present invention, in order to get rid of a scratch that occurs on the surface of a magnetic head by a surrounding dust, sand, and the like, being caught during a running of the medium, to thereby keep the surface of the magnetic head a mirror plane at all times. The α-alumina can be contained in any of a magnetic recording layer-coating solution, or an upperlayer thereof-coating solution (the overcoat solution), and then can be coated. In order to exhibit an effect of the alumina, it is preferred to select a particle size, and a coating method so that the height of surface protrusion of the alumina particles is substantially higher than the any average height of the surface protrusion of the spherical inorganic particles and the spherical organic high-molecular (polymer) particles in the magnetic recording medium (light-sensitive photographic material) after coating.

With respect to the spherical inorganic particles for use in the present invention, it is preferred that a particle size distribution is sharp, from a view point that dirt adhered onto a magnetic head can be instantly and effectively removed because the inorganic particles uniformly protrude from the surface of a medium. The spherical inorganic particles may be crystalline or noncrystalline in a practical use. The noncrystalline particles are preferred from the view point that a particle size distribution thereof is sharp. However, the present invention should not be limited to the use of noncrystalline particles. Silica particles and titanium oxide particles among inorganic particles are especially preferred from the view point of easy to gain practically.

Besides the spherical inorganic particles for use in the present invention to remove dirt adhered onto a magnetic head, spherical organic high-molecular particles can use in place of the spherical inorganic particles or can use in combination with the spherical inorganic particles, so as to maintain a spacing from a magnetic head, and to thereby prevent dirt from adhering onto the magnetic head.

Examples of the spherical organic high-molecular particles include resin particles, such as methacrylic resin, polystyrene, polysiloxane, melamine resin, benzoguanamine resin, polytetrafluoroethylene, cellulose acetate, polycarbonate, and polyamide (nylon). Preferred of these examples are poly(methyl methacrylate), polysiloxane, polystyrene, melamine resin, and benzoguanamine resin. Further, using in combination with the above materials and/or using a copolymer comprising monomers of the above materials is also preferably. Further, the particles may be particles made of organic high-molecular particles which have a core inorganic particle.

Alternatively, the organic high-molecular particles may be particles finely grained by various means, such as suspension polymerization, a spray-dry method, or a dispersion method, using a homopolymer or a copolymer derived from a single monomer, or at least two kinds of monomers, such as acrylic acid esters, methacrylic acid esters itaconic acid diesters, crotonic acid esters, maleic acid diesters, phthalic acid diesters, styrene derivatives, vinyl esters, acryl amides, vinyl ethers, allyl (compounds, vinyl ketones, vinyl heterocyclic compounds, acrylonitrile, methacrylonitrile, and multi-functional monomers.

In order to secure sufficient magnetic input/output performance, the organic high-molecular particles are not necessarily used, if a primary particle size of the above-mentioned spherical inorganic particles is suitably selected, because both an ability to remove dirt from the magnetic head, and a spacing from the magnetic head, are secured. For example, when a magnetic recording medium is used as a photographic element, even though the surface of the magnetic recording layer side (the surface of the spherical inorganic particles-coating side) is rubbed sliding against the surface of the light-sensitive silver halide emulsion layer side opposite thereto in a cartridge when a film is taken in and out of the cartridge, the surface of the emulsion layer side is rendered less damageable, because the particles that mainly contact the surface of the emulsion layer side are spherical organic high-molecular particles having a low hardness, by selecting an average particle size of spherical organic high-molecular particles that is larger than the size of the spherical inorganic particles. Due to this advantage, the spherical organic high-molecular particles are preferably used in a combination with the spherical inorganic particles.

The amount of the spherical inorganic particles or the spherical organic particles optionally added are not limitative in the present invention. They can be added in an amount sufficient to aid the prevention of deposition of dirt and to prevent the transparency of the magnetic recording medium from deteriorating.

Further, as a part of or all of a solvent of the overcoat solution containing the above-said spherical inorganic particles, and/or the above-said spherical organic high-molecular particles, together with the above-said lubricant wax dispersion, is used a solvent capable of dissolving an under layer of the above-said layer (in the present invention, dissolving a binder of the transparent magnetic recording layer), and thereby the above-described particles can be buried in the part of the under layer, so that the height of the protrusion becomes extremely uniform. It was found that the uniformity obtained by the above-described method is much excellent, compared to that obtained by incorporating the above-said particles in a transparent magnetic recording layer. Therefore the above described method is extremely advantageous to the compatibility of magnetic input/output performance and transparency. At this time, it is preferred that each of the particles has been buried in the transparent magnetic recording layer, in the proportion of 50% or more, and more preferably 60% or more, based on its volume, in order to prevent the particles from falling off. On the other hand, it is preferred that each of them is not buried in the proportion of 80% or more, based on its volume, in order to ensure both a sufficient cleaning function and a spacing function not to adhere dirt onto the head. A control of the degree of burying spherical particles is carried out by the size of the spherical particles, a solvent composition of the overcoat solution, drying conditions of the overcoat solution, and so on. It is preferred that the particle size distribution of the above-said spherical particles is sharp, because a pressure dispersion can be performed under a pressure caused by, for example, counter rollers, and sinking down of the particles is lessened, so that a spacing from the head can be widely maintained. Further, incorporation of diacetone alcohol into an overcoat solution preferably prevents a wax lubricant from diffusion to the under layer, and consequently a more excellent lubrication property can be obtained by a smaller amount of the wax lubricant. Such transparent magnetic recording media using the spherical inorganic particles and the spherical organic high-molecular particles as mentioned above, are described in JP-A-10-272523.

Specific examples of the spherical inorganic particles, the spherical organic high-molecular particles and the α-alumina particles for use in the present invention, include materials as described below. But, the present invention is not restricted to them. The following materials shown by hook-shaped parentheses each mean a trade name.

Spherical Inorganic Particle

"Seahostar KEP 30", "Seahostar KEP 50", "Seahostar KEP 70", "Seahostar KEP 90", "Seahostar KEP 100", all of which are manufactured by Nippon Shokubai Co., Ltd The above are amorphous silica.

"CR-EL" which is manufactured by Ishihara sangyo Co., Ltd. The above are titanium oxide.

Spherical Organic High-molecular Particle

"Tospearl 105," "Tospearl 108," and "XC99-A8808," all of which are manufactured by Toshiba Silicone Co., Ltd. The above are polysiloxane particles. "MX-100" and "MX-150," both of which are manufactured by Soken Chemical & Engineering Co., Ltd.; "P-1430" and "P-5000", both of which are manufactured by Nippon Paint Co., LTD. The above are PMMA particles.

"Epostar S12" and "Epostar S6," both of which are manufactured by Nippon Shokubai Co., Ltd. The above are melamine resin particles.

Specific examples of α-alumina are illustrated below. "AKP 30," "AKP 20," "AKP 15," "AKP 10," "Sumicorundum AA-1.5," "Sumicorundum AA-1.0," "Sumicorundum AA-0.7," "Sumicorundum AA-0.5," and "HIT 50," all of which are manufactured by Sumitomo Chemical Co., Ltd.; "ERC-DBM," manufactured by Reynolds Co., Ltd., and "Norton-E 600," manufactured by Norton Co., Ltd.

The α-alumina may be added to a magnetic substance-containing layer solution, an overcoat solution, or both of them. The addition to the magnetic substance-containing layer solution is more preferred.

Further, in order to lessen dirt of the head and an error in magnetic input/output, it is preferred to contain fine inorganic particles having an average primary particle size of from 1 nm to 50 nm in a coating amount of from 10 mg/m$^2$ to 200 mg/m² (more preferably from 30 mg/m² to 150 mg/m²), in the magnetic substance-containing layer solution or/and the overcoat solution, in addition to the above-described spherical inorganic particles and/or spherical organic high-molecular particles. It is especially preferred to contain the fine inorganic particles in the magnetic substance-containing layer solution. These fine inorganic particles are function that they finely divide the deposited dirt of the developing solution, and they make the dirt small in size rather than they form a spacing from a magnetic head, which the above-mentioned spherical inorganic particles and spherical organic high-molecular particles provide, and thereby they prevent the dirt from contacting with the magnetic head. The average primary particle size of the fine inorganic particles is preferably from 5 nm to 40 nm, and more preferably from 10 nm to 30 nm. When the particle size is more than 50 nm, the transparency reduces. On the other hand, the particles having a size of less than 1 nm is difficult to use practically.

Examples of the inorganic particles whose average primary particle diameter is from 1 nm to 50nm, include γ-alumina, θ-alumina, titanium dioxide, colloidal silica, and the like. In view of dispersion stability, colloidal silica is preferable. In the present invention, these small particles are used to form minute protuberances on the surface of a magnetic layer to finely divide dirt caused by a processing solution, and therefore, other particles besides the above-mentioned particles can be used in order to attain the object of the present invention. Specific examples of the small particles are illustrated below.

(γ-alumina)
"AKP-G015" (trade name) manufactured by Sumitomo Chemical Co., Ltd.
(θ-alumina)
"AKP-G008" (trade name) manufactured by Sumitomo Chemical Co., Ltd.
(Titanium dioxide)
"Idemitsu Titania" (trade name) manufactured by Idemitsu Petrochemical Co., Ltd.
(Colloidal silica)
"MEK-ST", "MIBK-ST", "Methanol Silica Sol", "MA-ST-M", and
"IPA-ST" (trade names), all of which are manufactured by Nissan Chemical Industries, Ltd.

The thickness of the magnetic recording layer is generally from 0.3 μm to 1.5 μm, and preferably from 0.5 μm to 1.2 μm. The number of the magnetic recording layers is preferably from 1 to 3.

A thickness of the wax lubricant layer which is overlaid upon the magnetic recording layer, is from 0.01 μm to 0.1 μm, preferably from 0.02 μm to 0.07 μm, and more preferably from 0.03 μm to 0.05 μm. The number of the wax lubricant layers is preferably from 1 to 3.

Further, preferably a thickness of the magnetic recording layer is designed so as to become 50% or more compared with the particle size of the particles to be used, so that the magnetic recording layer fully holds the spherical inorganic particles and the spherical organic high-molecular particles.

The refractive index of the particles for use in the present invention is not particularly limited. However, the difference of the refractive index between the particles and the layer to contain the particles, is preferably 0.08 or less, more preferably 0.04 or less, and still more preferably 0.02 or less, from the point that transparency of the medium, such as haze, can be improved.

It is industrially preferred that the lubricant wax dispersion, the spherical inorganic particles, the spherical organic high-molecular particles, the α-alumina abrasives, the fine inorganic particles, and the like, for use in the present invention, are prepared as a dispersion solution thereof, respectively, and they are added to the final coating solution, followed by agitation and preparation. Further, a dispersion solution can be produced by selecting the same dispersion method (dispersing machine, etc.) as a magnetic substance hereinafter described.

When a magnetic recording medium of the present invention is provided on a photographic film, the degree of haze of all layers coated on the side of a magnetic recording layer, is preferably less than 9%, and more preferably less than 8%. The transparent magnetic recording layer means a magnetic recording layer that exhibits transparency on a level that does not substantially affect the photographic image quality. Further, the transparent layer herein referred to generally provides 0 to 0.2, preferably from 0 to 0.15, and more preferably from 0 to 0.12, in terms of blue-filter transmission density.

Examples of magnetic particles that can be contained in a transparent magnetic recording layer for use in the present invention, include ferromagnetic iron oxide, such as γ-$Fe_2O_3$ ($FeO_x$, 4/3<x≦3/2), Co-coated ferromagnetic iron oxide, such as Co-coated γ-$Fe_2O_3$ ($FeO_x$, 4/3<x≦3/2), Co-coated magnetite, and further Co-doped ferromagnetic iron oxide, Co-doped magnetite, ferromagnetic chromium dioxide, ferromagnetic metal, ferromagnetic alloy, and other magnetites and ferrites, e.g. hexagonal system Ba ferrite, Sr ferrite, Pb ferrite, and Ca ferrite, and a solid solution of these substances or ion substitutes of these substances.

The shape of the ferromagnetic substance may be any of an acicular shape (needle-like), a rice-particle-like shape, a spherical shape, a cubic shape, and a plate-like shape. Among these, a needle-like ferromagnetic substance is preferred from a viewpoint of electromagnetic conversion characteristics. Turning to the particle size, when the magnetic substance is needle-like, the particle size (the length of the longer axis ) is preferably from 0.01 μm to 0.5 μm, and the ratio of the longer axis to the shorter axis is preferably from 50:1 to 2:1, and more preferably the length of the longer axis is from 0.1 μm to 0.35 μm, and the ratio of the longer axis to the shorter axis is from 20:1 to 3:1. The specific surface area of the particle is preferably 30 m²/g or more, and particularly preferably 40 m²/g or more, in terms of $S_{BET}$. The particle size distribution of the magnetic substance is preferably as sharp as possible, from viewpoints of magnetic property and haze. The saturation magnetization (σs) of the ferromagnetic substance is preferably 50 emu/g or more, and more preferably 70 emu/g or more. Further, the rectangularity (squareness) ratio (σr/σs) of the ferromagnetic substance is preferably 40% or more, and more preferably 45% or more. The coercive force (Hc) is generally from 200 Oe to 3000 Oe, and preferably from 500 Oe to 2000 Oe.

The content of the magnetic particles in a magnetic recording layer is preferably from 10 mg/m² to 100 mg/m², from a viewpoint of the balance between magnetic reading power (efficiency) and transparency.

These ferromagnetic particle s may be subjected to surface treatment with silica and/or alumina, as those described in, for example, JP-A-59-23505 and JP-A-4-096052. Alternatively, they may be subjected to surface treatment with inorganic and/or organic material, as described, for example, in JP-A-4-195726, JP-A-4-192116, JP-A-4-259911, and JP A-5-081652. Further, the surface of these ferromagnetic particles may be treated with a silane coupling agent or a titanium coupling agent. Specific examples of the coupling agent to be used include 3-mercaptopropyl trimethoxysilane, 3-isocyanylpropyl methyldimethoxysilane, 3-(poly(degree of polymerization 10)oxyethynyl)oxypropyl trimethoxysilane, 3-methoxy (poly (degree of polymerization 6) oxyethynyl)oxypropyl trimethoxysilane, and decyltrimethoxy silane. The amount of these silane coupling agents and titanium coupling agents to be added to the magnetic particles, is generally from 1.0 to 200 wt %, preferably from 1 to 75 wt %, and more preferably from 2 to 50 wt %. Further, these silane coupling agents and titanium coupling agents may be treated according to a direct processing method for the magnetic particles, or alternatively an integral blend method. The direct processing method is a general term (name) for a dry process, a slurry process (method), and a spray process (method). A preferable embodiment according to the dry process is that magnetic particles and a small amount of water or an organic solvent, or magnetic particles and an organic solvent containing water, and a coupling agent are mixed, and then the water and/or the organic solvent are removed from the resultant mixture by means of an open-type kneader with stirring, followed by fine dispersion.

Preferred among methods of dispersing the above-described magnetic substance in a binder (hereinafter described), are a kneader, a pin-type mill, and an annular-type mill, and the like. The combined use of a kneader and a pin-type mill, or the combined use of a kneader and an annular-type mill, is also preferred. The kneader is a general term (name) for open-type, closed-type, and continuation (succession)-type kneaders. Alternatively, other kneaders, such as a three roll mill and a laboplastmill, can also be used. A dispersion by means of a micro fluidizer is also preferably applied.

The coercive force of the magnetic recording layer is generally from 500 Oe to 3000 Oe, and preferably from 800 Oe to 1500 Oe.

A magnetic recording layer can be provided with a stripe pattern, or the layer is provided all over the surface, on the surface of the photographic support. The magnetic recording layer, having been coated on a support, is subjected to a processing for orientation, during the drying of magnetic materials in the layer instantly after the coating, if necessary, and then the resulting magnetic recording layer is dried. Methods of using a permanent magnet or a solenoid coil can be used for orientation of the magnetic substance. The strength of the permanent magnet is preferably 2000 Oe or more, and particularly preferably 3000 Oe or more. On the other hand, the strength of the solenoid coil may be 500 Oe or more. Further, the timing of the orientation at the drying step is preferably a specific point at which an amount of the solvent remaining in a magnetic recording layer reaches the range of from 5% to 70%.

A binder for layers, including a magnetic recording layer for use in the present invention, and the like, is described below. The following can be used as the binder for use in the present invention: thermoplastic resins, thermosetting resins, reactive-type resins; polymers having an acid or alkali decomposability, or a biodegradability; natural polymers (e.g. cellulose derivatives, sugar derivatives), and a mixture thereof. The glass transition temperature, Tg, of the above resins is preferably from −40° C. to 300° C., and the weight-average molecular weight is preferably from 2,000 to 1,000,000, more preferably from 5,000 to 300,000.

Further, among binders that constitute a magnetic recording layer, cellulose esters whose substitution degree is from 1.7 to 2.9, are preferably used. Cellulose diacetate, cellulose acetate butylate, and cellulose acetate propionate are particularly preferred. Diacetyl cellulose is most preferred from the view point of easy to handle and binder strength.

The following polar group may be introduced into the above-described binder: an epoxy group, $CO_2M$, OH, $NR_2$, $NR_3^+X^-$, $SO_3M$, $OSO_3M$, $PO_3M_2$, or $OPO_3M_2$, wherein M represents a hydrogen atom, an alkali metal, or an ammonium, with the proviso that when the group contains two or more Ms, they are the same or different; R represents a hydrogen atom or an alkyl group, and $X^-$ represents a halogen ion and the like.

The above-listed binders may be used singly or in a mixture thereof, and they may contain crosslinking agents such as epoxy-, aziridine-, and isocyanate-series crosslinking agents. By using crosslinking agents, it is possible to strengthen the adhesion of layer itself or adhesion between layers. The isocyanate-series crosslinking agents include polyisocyanate compounds having two or more isocyanate groups, with examples including isocyanates, such as tolylene diisocyanate, hexamethylene diisocyanate, xylylene diisocyanate, naphthalene-1,5-diisocyanate, o-toluidine diisocyanate, isophorone diisocyanate, and triphenylmethane diisocyanate; reaction products of these isocyanates and polyalcohols (e.g. a reaction product of tolylene diisocyanate (3 mol) and trimethylol propane (1 mol)); and polyisocyanates produced by the condensation of these isocyanates. Among the above crosslinking agents, isocyanate-series crosslinking agents represented by the following formula (4) are particularly preferable.

Formula (4):

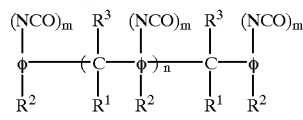

φ: benzene nucleus

In the formula (4), n is preferably in the range of 0 to 50, more preferably from 0 to 30, and further preferably from 0 to 10. The number of n is not necessarily single, but may have a distribution. φ represents a benzene ring. m is an integer of 1 or 2. $R^1$, $R^2$, and $R^3$ each represent a hydrogen atom, an alkyl group (having 1 or more carbon atoms), or an aryl group (having 6 or more carbon atoms).

The viscosity of the crosslinking agent is preferably from 50 (cP/25° C.) to 1000 (cP/25° C.). Further, the NCO content of the crosslinking agent is preferably from 20 to 40%, and more preferably from 25 to 35%. Examples of commercially available products of the crosslinking agent include "Millionate MT," "Millionate MR-100," "Millionate MR-200," "Millionate MR-300," and "Millionate MR-400" (trade names, manufactured by Japan Polyurethane Co., Ltd.), and "Sumidur 44V10" (trade name, manufactured by Sumitono Bayer Urethane Co., Ltd.).

The coating amount of the above crosslinking agent is preferably from 3 mg/m² to 1000 mg/m², more preferably from 5 mg/m² to 300 mg/m², and further preferably from 10 mg/m² to 150 mg/m². In order to sufficiently form bridge formation using the crosslinking agent, it is preferable to heat and dry at 50° C. or more, more preferably 70° C. or more, for 1 min to 72 hrs.

When use is made of the above crosslinking agent, in combination with at least one of a tertiary amine-series, a metal salt-series, and a DBU (1,8-diazabicyclo[5.4.0] undecene-7)-series compound at the same time, is able to accelerate the crosslinking reaction speed of the layer per se (the layer containing the crosslinking agent), or between the layer and a layer adjacent therewith, whereby the crosslinking reaction time for improvement of durability can be shortened. Examples of the tertiary amine-series compound include tetramethylbutanediamine, 1,4-diazabicyclo[2.2.2] octane, and triethylamine, as described by Bruins et al., in Polyurethane Technology, p.25, Interscience (1960). Further, examples of the metal salt-series compound include dibutyltin dilaurate, tin caprylate, cobalt naphthenate, stannous chloride, tetra-n-butyl tin, stannic chloride, trimethyl tin hydroxide, and dimethyl tin dichloride. These compounds may be added, for example, to a coating solution for a magnetic recording layer, in combination with the above crosslinking agent, followed by coating the thus-obtained coating solution onto a support. Additionally, or alternatively, these compounds may be added to a coating solution for an under layer and/or an upper layer to be coated below or above a magnetic recording layer, so that these compounds can be diffused to the magnetic recording layer.

Examples of the film support for use in the present invention include triacetylcellulose (TAC), polyamides, polycarbonates, and polyesters. Preferred materials are polyesters. The preferable weight-average molecular weight of these polyesters is within the range of about 5,000 to 200,000. Of these polyesters for use in the present invention, preferred are those having a glass transition temperature (Tg) in the range of generally from 70° C. to 170° C., preferably from 90° C. to 150° C. Specific examples of polyesters that can be used in the present invention include the following compounds.

Examples of Polyester Compounds

| P-1: | [Terephthalic acid (TPA)/Ethylene glycol (EG) (100/100)] (PET) | Tg = 80° C. |
| P-2: | [2,6-Naphthalenedicarboxylic acid (NDCA)/ Ethylene glycol (EG) (100/100)] (PEN) | Tg = 119° C. |
| P-3: | 2,6-NDCA/TPA/EG (50/50/100) | Tg = 92° C. |
| P-4: | PEN/PET (60/40) | Tg = 95° C. |
| P-5: | PEN/PET (80/20) | Tg = 104° C. |

Preferable polyesters are those containing 2,6-naphthalenedicarboxylic acid as a constituting member, in which 2,6-naphthalenedicarboxylic acid is contained in an amount of 10 mol % or more of all dicarboxylic acids in constituting members. Polyethylene-2,6-naphthalenedicarboxylate is particularly preferred of all. Further, the thickness of a support is preferably from 80 $\mu$m to 115 $\mu$m, and particularly preferably from 85 $\mu$m to 105 $\mu$m. Further, a polyester support, prior to coating a light-sensitive layer thereon, may be subjected to heat treatment at a temperature ranging from 40° C. to glass transition temperature, for a period of from 0.1 to 1500 hours, whereby core-set curl can hardly occurs for the roll-formed light-sensitive material.

A plasticizer, such as triphenyl phosphate, biphenyldiphenyl phosphate, and dimethylethyl phosphate, is usually added in TAC support. The support may contain a dye for various purposes of neutralization of base coloring, light-piping prevention, and antihalation. These supports may be subjected to a surface treatment, in order to achieve strong adhesion between the support and a photographic constituting layer (e.g. a light-sensitive silver halide emulsion layer, an interlayer, a filter layer, a magnetic recording layer, an electrically conductive layer), and then a photographic emulsion is coated directly onto the support. For the above-mentioned surface treatment, various surface-activation treatments can be used, such as a chemical treatment, a mechanical treatment, a corona discharge treatment, a flame treatment, an ultraviolet ray treatment, a high-frequency treatment, a glow discharge treatment, an active plasma treatment, a laser treatment, a mixed acid treatment, and an ozone oxidation treatment. Alternatively, once the support is subjected to the above-described surface treatment, or if the surface treatment is omitted, then a subbing layer may be coated on the support, followed by a coating of a photographic emulsion layer on the subbing layer.

Further, a transparent magnetic recording medium of the present invention may contain other additives, such as a dye and a surfactant. Further, a silicon-series compound and/or a fluorine-series compound (a fluorine-containing compound) are preferably incorporated in at least one of layers on the side of the transparent magnetic recording layer of a transparent magnetic recording medium of the present invention. This is because dirt (deposit) hardly adheres to the surface of the medium, and consequently dirt hardly transfers to a magnetic head, which results in less magnetic input/output trouble. Specific examples of these compounds include FC-431 (trade name, manufactured by Sumitomo 3M Co., Ltd.). Preferable examples of a lubricant for use in a transparent magnetic recording medium of the present invention, are higher fatty acid esters (esters obtained from a fatty acid having 10 to 24 carbon atoms and an alcohol having 10 to 60 carbon atoms).

Preferred examples of the magnetic recording media according to the present invention, include a color reversal film and a color nega film, both of which contain a light-sensitive silver halide layer. Color nega films for general use are particularly preferred. The light-sensitive material may have the magnetic recording layer on the overall surface of the light-sensitive material, or may have the layer on a part of the surface. The silver halide emulsion is generally subjected to physical ripening, chemical ripening, and spectral sensitization, for practical use. The present invention particularly markably exhibits its effects when the emulsion sensitized with both a gold compound and a sulfur-containing compound is used. Additives that can be used in these steps are described in Research Disclosure Nos. 17643 and 18716, and the corresponding passages are listed below.

Known photographic additives that can be used in the present invention are also described in the above-mentioned two Research Disclosures, and involved sections are listed in the same Table below.

| Additive | RD 17643 | RD 18716 |
|---|---|---|
| 1 Chemical sensitizers | p. 23 | p. 648 (right column) |
| 2 Sensitivity-enhancing agents | — | p. 648 (right column) |
| 3 Spectral sensitizers and Supersensitizers | pp. 23–24 | pp. 648 (right column)–649 (right column) |
| 4 Brightening agents | p. 24 | |
| 5 Antifogging agents and Stabilizers | pp. 24–25 | p. 649 (right column) |
| 6 Light absorbers, Filter dyes, and UV Absorbers | pp. 25–26 | pp. 649 (right column)–650 (left column) |
| 7 Stain-preventing agents | p. 25 (right column) | p. 650 (left to right column) |
| 8 Image dye stabilizers | p. 25 | |
| 9 Hardeners | p. 26 | p. 651 (left column) |

-continued

| Additive | RD 17643 | RD 18716 |
|---|---|---|
| 10 Binders | p. 26 | p. 651 (left column) |
| 11 Plasticizers and Lubricants | p. 27 | p. 650 (left column) |
| 12 Coating aids and Surfactants | pp. 26–27 | p. 650 (right column) |

The present invention provides an excellent transparent magnetic recording medium that exhibits both a good state of coated surface and secure magnetic input/output performance, and a silver halide photographic light-sensitive material comprising the above-described transparent magnetic recording medium.

The present invention is described in more detail with reference to the following examples, but the present invention is not limited thereto.

EXAMPLES

1) First Layer and Subbing Layer

A glow discharge treatment was conducted to both surfaces of a polyethylene naphthalate support of 90 μm thickness, at the conditions of processing atmosphere pressure, 0.2 Torr; $H_2O$ partial pressure in atmosphere, 75%; discharge frequency, 30 kHz; output, 2500 W; and processing strength, 0.5 kV·A·min/m$^2$. A coating solution having the formulation shown below, was coated, as the first layer, onto the above-said support, in a coated amount of 5 cc/m$^2$, according to the bar method described in JP-B-58-4589.

| | |
|---|---|
| Dispersion solution of electrically conductive fine particles (aqueous dispersion solution having 10% density of $SnO_2/Sb_2O_5$ particles. Secondary aggregate, whose average particle diameter was 0.05 μm, composed of particles whose primary particle diameter was 0.005 μm.) | 50 weight parts |
| Gelatin | 0.5 weight part |
| Water | 49 weight parts |
| Polyglycerol polyglycidyl ether | 0.16 weight part |
| Polyoxyethylene sorbitan mono-laurate (polymerization degree 20) | 0.1 weight part |

Further, after the first layer was coated on the support, the resultant support was wound a round a stainless reel 20 cm in diameter, followed by heat treatment at 110° C. (Tg of the PEN support: 119° C.) for 48 hours, in order to give the support thermal hysteresis and subject it to an annealing treatment. Subsequently, a coating solution having the formulation shown below, was coated using a bar coating, in a coating amount of 10 cc/m$^2$, as a subbing layer for a silver halide emulsion, opposite to the surface of the support having coated thereon the first layer.

| | |
|---|---|
| Gelatin | 1.01 weight part |
| Salicylic acid | 0.30 weight part |
| Resorcin | 0.40 weight part |
| Poly(polymerization degree 10) oxyethylene nonylphenylether | 0.11 weight part |

| | |
|---|---|
| Water | 3.53 weight parts |
| Methanol | 84.57 weight parts |
| n-Propanol | 10.08 weight parts |

Further, the second layer and the third layer as described below were successively coated on the first layer, and finally a color negative light-sensitive material described below was multi-layer coated on the opposite side, to prepare a transparent magnetic recording medium having a silver halide emulsion layer.

2) Second Layer (transparent magnetic recording layer)

① Dispersion of Magnetic Substance

To an open-type kneader, 1100 weight parts of Co-coated γ-$Fe_2O_3$ magnetic substance (average length of the longer axis, 0.25 μm; $S_{BET}$, 39 m$^2$/g; Hc, 831 Oe; σs, 77.1 emu/g; σr, 37.4 emu/g), 220 weight parts of water, and 165 weight parts of the silane coupling agent [3-(poly(polymerization degree 10)oxyethynyl)oxypropyl trimethoxysilane] were added, and this mixture was well kneaded for 3 hours. The thus coarsely dispersed viscous solution was dried at 70° C. for 24 hours, to remove water. After that, the resultant dry powder was further subjected to heal: treatment at 110° C. for 1 hour, to prepare surface-treated magnetic particles.

Further, a mixture having the following formulation was again kneaded in an open-type kneader for 4 hours:

The above-described surface-treated magnetic

| | |
|---|---|
| particles | 855 g |
| Diacetyl cellulose | 25.3 g |
| Methyl ethyl ketone | 136.3 g |
| Cyclohexanone | 136.3 g |

Further, a mixture having the following formulation was finely dispersed by means of a sand mill (1/4 G), at the rate of 2000 rpm, for 4 hours. As a media, glass beads having a diameter of 1 mmφ were used.

| | |
|---|---|
| The above-described kneaded solution | 45 g |
| Diacetyl cellulose | 23.7 g |
| Methyl ethyl ketone | 127.7 g |
| Cyclohexanone | 127.7 g |

Further, a magnetic substance-containing intermediate solution was prepared according to the following formulation.

② Preparation of Magnetic Substance-containing Intermediate Solution

| | |
|---|---|
| The above-described magnetic substance finely dispersed solution | 674 g |
| Diacetyl cellulose solution (solid content 4.34%, solvent: methyl ethylketone/cyclohexanone = 1/1) | 24280 g |
| Cyclohexanone | 46 g |

These were mixed and then stirred by a Disper, to prepare "the magnetic substance-containing intermediate solution".

α-alumina abrasive dispersion solution for use in the present invention, was prepared according to the following formulation.

[a] Sumicorundum AA-1.5 (average primary particle diameter of 1.5 μm, specific surface area of 1.3 m$^2$/g)

| | |
|---|---|
| Preparation of particle dispersion solution | |
| Sumicorundum AA-1.5 | 38 g |
| Silane coupling agent KBM 903 (trade name, manufactured by Shinetsu silicone Co.) | 0.12 g |
| Diacetyl cellulose solution (solid content 4.5%, solvent: methyl ethylketone/cyclohexanone = 1/1) | 341.88 g |

The mixture having the above formulation was finely dispersed by means of a sand mill (1/4 G), at the rate of 800 rpm, for 4 hours. As a media, zirconia beads having a diameter of 1 mmφ were used.

[b] Colloidal silica particle-dispersed solution (fine particles)

"MEK-ST" (trade name) manufactured by Nissan Chemical Industries Ltd. was used.

This was a dispersed solution of colloidal silica having average primary particle diameter of 0.015 μm in methyl ethyl ketone as a dispersion medium, and the solid content of the colloidal silica was 30%.

③ Preparation of second layer coating solution

| | |
|---|---|
| The above-described magnetic substance-containing intermediate solution | 19053 g |
| Diacetyl cellulose solution (solid content 4.5%, solvent: methyl ethylketone/cyclohexanone = 1/1) | 230 g |
| Colloidal silica dispersion solution [MEK-ST] [dispersion solution b] (solid content 30%) | 128 g |
| AA-1.5 dispersed solution [dispersion solution a] | 46 g |
| Millionate MR-400 (manufactured by Nippon Polyurethane Co., Ltd.) diluted solution (solid content 20%, diluting solvent: methyl ethylketone/cyclohexanone = 1/1) | 203 g |
| Methyl ethyl ketone | 170 g |
| Cyclohexanone | 170 g |

The coating solution which was obtained by mixing and stirring the above, was coated in a coating amount of 29.3 cc/m$^2$ by means of a wire bar. Drying of the coated layer was performed at 110° C. The thickness of the dried magnetic layer was 1.0 μm.

3) Third Layer (an overcoat solution: higher fatty acid ester lubricant dispersion-containing solution)

①-1 Preparation of Lubricant-undiluted Dispersion Solution

Solution A having the following formulation was dissolved by heating at 100° C., it was added to the following Solution B, and the resultant mixture was dispersed by means of a high-pressure homogenizer, to obtain a lubricant-undiluted dispersion solution.

| | |
|---|---|
| Solution A | |
| The compound shown below $C_6H_{13}CH(OH)(CH_2)_{10}COOC_{50}H_{101}$ | 285 weight parts |
| The compound shown below n-$C_{50}H_{101}O(CH_2CH_2O)_{16}H$ | 285 weight parts |
| Cyclohexanone | 830 weight parts |
| Solution B | |
| Cyclohexanone | 8600 weight parts |

①-2 Dilution of Lubricant-undiluted Dispersion Solution

| | |
|---|---|
| Above-described lubricant-undiluted dispersion solution | 1000 weight parts |
| Diacetone alcohol | 2800 weight parts |

② Preparation of Spherical Inorganic Particle Dispersion Solution

Spherical inorganic particle dispersion solution [c] was prepared according to the following formulation.

| | |
|---|---|
| Isopropyl alcohol | 93.54 weight parts |
| Silane coupling agent KBM 903 (trade name, manufactured by Shinetsu silicone Co.) | 5.53 weight parts |
| Seahostar KEP 50 (amorphous spherical silica; average particle diameter: 0.5 μm; trade name, manufactured by Nippon Shokubai Co., Ltd) | 88.00 weight parts |

The mixture having the above formulation was mixed for 10 minutes, and further the following was added.

| | |
|---|---|
| Diacetone alcohol | 252.93 weight parts |

A mixture solution of the above was dispersed while stirring for 3 hour on an ice bath by means of the ultrasonic wave homogenizer "SONIFIER 450 (trade name, manufactured by BRANSON Co., Ltd.)", to obtain spherical inorganic particles dispersed solution c.

③ Preparation of Spherical Organic High-molecular Particles Dispersion Solution

Spherical organic high-molecular particles dispersion solution [d] was prepared according to the following formulation.

| | |
|---|---|
| XC99-A8808 (spherical polysiloxane particles; average particle diameter: 0.9 μm; manufactured by Toshiba Silicone Co., Ltd.) | 160 g |
| Methyl ethyl ketone | 120 g |
| Cyclohexanone (solid content 40%, solvent: Methyl ethyl ketone/ Cyclohexanone = 1/1) | 120 g |

A mixture solution of the above was dispersed while stirring for 2 hour on an ice bath by means of the ultrasonic wave homogenizer "SONIFIER 450 (trade name, manufactured by BRANSON Co., Ltd.)", to obtain spherical organic high-molecular particles dispersion solution [d].

④ Preparation of Third Layer Coating Solution (an overcoat solution)

Solvents shown below were added to 1617 g of the above-described the diluted solution of the lubricant-undiluted dispersion solution, to obtain a third layer coating solution.

| | |
|---|---|
| Compound 6-1 | 1.21 g |
| (It suits 5% against all weight of the diluted solution of the lubricant-undiluted dispersion solution.) | |
| Diacetone alcohol | 1107 g |
| Ethyl acetate | 1200 g |
| The above shown XC99-A8808 dispersion solution [d] | 28 g |
| The above shown Seahostar KEP 50 dispersion solution [c] | 42 g |
| FC 431 (trade name, manufactured by Sumitomo 3M Co., Ltd.; solid content 50%; solvent, ethyl acetate) | 2 g |
| BYK 310 (trade name, manufactured by BYK Chemi Japan Co., Ltd.; solid content 25%) | 4 g |

The above-described third layer coating solution was coated on the second layer in a coating amount of 6.9 cc/m², followed by drying at 110° C., and further dried at 97° C. for 3 minutes.

Thus, Example sample 1 was prepared. Evaluation of Coating Products (Prepared Samples)

[1] Evaluation of State of coated surface

In order to evaluate the state of coated surface after coating, the following judgement was made.

| State of coated surface | Rate |
|---|---|
| Excellent: | ⊚⊚ |
| Good: | ⊚ |
| Fair: | ○ (The same level as Nexia 400, manufactured by Fuji Photo Film Co., Ltd.) |
| Passing: | Δ |
| Failure: | x |

[2] Evaluation of Magnetic Input/output performance

A sample having the later-described silver halide emulsion layer coated on the back surface of the support having thereon a magnetic recording layer, was slited to size 1.5 m length and 24 mm width. Thereafter, the recorded signals were reproduced by means of a widely used type of magnetic reproduction head, having a gap of 5 μm and a winding number of 2000 turns, while conveying the sample at the rate of 100 mm/sec, using an amplifier that has a gain of about 60 db. Each of the samples was previously subjected to magnetic recording by means of FM signals of 20 bpm and 40 bpm. When the magnitude of each of the outputs (the reproduced signals) is defined as $S_{20}$ and $S_{40}$, respectively, A judgement was made as follows:

| | |
|---|---|
| $(S_{40}/S_{20}) \times 100 \geq 97$: | ⊚ |
| $94 \leq (S_{40}/S_{20}) \times 100 < 97$: | ○ |
| $90 \leq (S_{40}/S_{20}) \times 100 < 94$: | Δ |
| $(S_{40}/S_{20}) \times 100 < 90$: | x |

If the state of coated surface deteriorates, the contact of the medium surface with a magnetic head becomes worse, and consequently a high-frequency recording, in particular, becomes difficult. Accordingly, if the state of coated surface deteriorates, the value of $S_{40}/S_{20}$ becomes small.

[3] Evaluation of lubrication property

The thus-prepared samples were humidified at the temperature of 25° C. and the humidity of 60% RH for 2 hours, and thereafter a coefficient of kinematic friction thereof was measured by means of HEIDON-14 (trade name) coefficient of kinematic friction measuring instrument, under conditions of the load of 100 g using stainless steel balls, each having a diameter of 5 mm, and the friction rate of 60 cm/min. The smaller value the better lubrication property is.

TABLE 1

| | | Surfactant | | Evaluation result | | |
|---|---|---|---|---|---|---|
| | | | Amount to be used | | | |
| Samples | Compound | Kind | (%) (Based on the total weight of the wax lubricant dispersion) | State of coated surface | Magnetic recording performance ($S_{40}/S_{20}$) | Lubrication property (Coefficient of kinematic friction) |
| Example 1 | 6-1 | Anion | 5 | ⊚⊚ | ⊚ | 0.10 |
| Comparative example 2 | — | — | 0 | Δ | Δ | 0.10 |
| Example 3 | 6-2 | Anion | 5 | ⊚⊚ | ⊚ | 0.10 |
| Example 4 | 6-12 | Anion | 5 | ⊚⊚ | ⊚ | 0.10 |
| Example 5 | 6-13 | Anion | 5 | ⊚ | ○ | 0.10 |
| Example 6 | 6-15 | Anion | 5 | ⊚ | ○ | 0.10 |
| Comparative example 7 | 7 | Cation | 5 | x | x | 0.10 |
| Comparative example 8 | 8 | Cation | 5 | x | x | 0.10 |
| Comparative example 9 | 9 | Nonion | 5 | Δ | Δ | 0.10 |
| Comparative example 10 | 10 | Nonion | 5 | Δ | Δ | 0.10 |
| Comparative example 11 | 11 | Betain | 5 | x | x | 0.10 |
| Comparative example 12 | 12 | Betain | 5 | x | x | 0.10 |
| Example 13 | 6-1 | Anion | 0.1 | ○ | ○ | 0.10 |

TABLE 1-continued

| Samples | Surfactant | | Amount to be used (%) (Based on the total weight of the wax lubricant dispersion) | Evaluation result | | |
|---|---|---|---|---|---|---|
| | Compound | Kind | | State of coated surface | Magnetic recording performance ($S_{40}/S_{20}$) | Lubrication property (Coefficient of kinematic friction) |
| Example 14 | 6-1 | Anion | 0.5 | ◉ | ◉ | 0.10 |
| Example 15 | 6-1 | Anion | 1 | ◉ ◉ | ◉ | 0.10 |
| Example 16 | 6-1 | Anion | 10 | ◉ ◉ | ◉ | 0.10 |
| Example 17 | 6-1 | Anion | 30 | ◉ ◉ | ◉ | 0.11 |
| Comparative example 18 | 6-1 | Anion | 50 | ◉ ◉ | ◉ | 0.17 |
| Comparative example 19 | 6-1 | Anion | 100 | ◉ ◉ | ◉ | 0.22 |
| Example 20 | 6-1 | Anion | 5 (previously treated) | ◉ ◉ | ◉ | 0.10 |
| Example 21 | 6-1 | Anion | 0.1 (previously treeted) | ◉ | ◉ | 0.10 |
| Example 22 | 6-1 | Anion | 0.5 (previously treated) | ◉ ◉ | ◉ | 0.10 |
| Example 23 | 6-1 | Anion | 1 (previously treated) | ◉ ◉ | ◉ | 0.10 |
| Example 24 | 6-1 | Anion | 1 (previously treated) | ◉ ◉ | ◉ | 0.10 |

As is apparent from Table 1, the samples of the present invention attain the compatibility of the excellent state of coated surface and secure magnetic input/output performance, and therefore the samples are very excellent transparent magnetic recording mediums.

Comparative example 2

Comparative example 2 sample was prepared in the same manner as in Example 1 sample, except that the compound 6-1 was not used.

Example 3

Example 3 sample was prepared in the same manner as in Example 1 sample, except that the compound 6-1 was changed to the compound 6-2.

Example 4

Example 4 sample was prepared in the same manner as in Example 1 sample, except that the compound 6-1 was changed to the compound 6-12.

Example 5

Example 5 sample was prepared in the same manner as in Example 1 sample, except that the compound 6-1 was changed to the compound 6-13.

Example 6

Example 6 sample was prepared in the same manner as in Example 1 sample, except that the compound 6-1 was changed to the compound 6-15.

Comparative Example 7

Comparative example 7 sample was prepared in the same manner as in Example 1 sample, except that the compound 6-1 was changed to the following compound (cation sarfactant).

compound

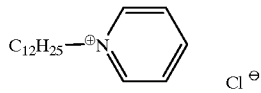

Comparative Example 8

Comparative example 8 sample was prepared in the same manner As in Example 1 sample, except that the compound 6-1 was changed to the following compound (cation sarfactant).

compound

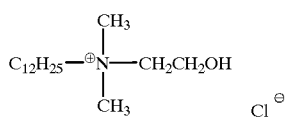

Comparative Example 9

Comparative example 9 sample was prepared in the same manner as in Example 1 sample, except that the compound 6-1 was changed to the following compound (nonion sarfactant).

compound

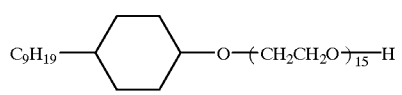

Comparative Example 10

Comparative example 10 sample was prepared in the same manner as in Example 1 sample, except that the compound 6-1 was changed to the following compound (nonion sarfactant).

compound

Comparative Example 11

Comparative example 11 sample was prepared in the same manner as in Example 1 sample, except that the compound 6-1 was changed to the following compound (betain sarfactant).
compound

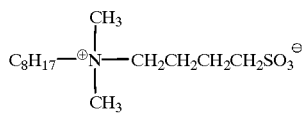

Comparative Example 12

Comparative example 12 sample was prepared in the same manner as in Example 1 sample, except that the compound 6-1 was changed to the following compound (betain sarfactant).
compound

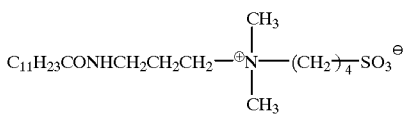

Example 13

Example 13 sample was prepared in the same manner as in Example 1 sample, except that the amount of the use of the compound 6-1 was changed to 0.02 g (per 0.1% of lubricant dispersion weight).

Example 14

Example 14 sample was prepared in the same manner as in Example 1 sample, except that the amount of the use of the compound 6-1 was changed to 0.12 g (per 0.5% of lubricant dispersion weight).

Example 15

Example 15 sample was prepared in the same manner as in Example 1 sample, except that the amount of the use of the compound 6-1 was changed to 0.24 g (per 1.0% of lubricant dispersion weight).

Example 16

Example 16 sample was prepared in the same manner as in Example 1 sample, except that the amount of the use of the compound 6-1 was changed to 2.43 g (per 10% of lubricant dispersion weight).

Example 17

Example 17 sample was prepared in the same manner as in Example 1 sample, except that the amount of the use of the compound 6-1 was changed to 7.28 g (per 30% of lubricant dispersion weight).

Comparative Example 18

Comparative example 18 sample was prepared in the same manner as in Example 1 sample, except that the amount of the use of the compound 6-1 was changed to 12.13 g (per 50% of lubricant dispersion weight).

Comparative Example 19

Comparative example 19 sample was prepared in the same manner as in Example 1 sample, except that the amount of the use of the compound 6-1 was changed to 24.26 g (per 100% of lubricant dispersion weight).

Example 20

Example 20 sample was prepared in the same manner as in Example 1 sample, except that compound 6-1 was added to a lubricant dispersion solution in advance, so as to previously adsorb it on the surface of the dispersed lubricant, and thereafter it was added to a third layer-coating solution (an overcoat solution) with the lubricant dispersion.

Example 21

Example 21 sample was prepared in the same manner as in Example 13 sample, except that compound 6-1 was added to a lubricant dispersion solution in advance, so as to previously adsorb it on the surface of the dispersed lubricant, and thereafter it was added to a third layer-coating solution (an overcoat solution) with the lubricant dispersion.

Example 22

Example 22 sample was prepared in the same manner as in Example 14 sample, except that compound 6-1 was added to a lubricant dispersion solution in advance, so as to previously adsorb it on the surface of the dispersed lubricant, and thereafter it was added to a third layer-coating solution (an overcoat solution) with the lubricant dispersion.

Example 23

Example 23 sample was prepared in the same manner as in Example 15 sample, except that compound 6-1 was added to a lubricant dispersion solution in advance, so as to previously adsorb it on the surface of the dispersed lubricant, and thereafter it was added to a third layer-coating solution (an overcoat solution) with the lubricant dispersion.

Example 24

Example 24 sample was prepared in the same manner as in Example 23 sample, except that spherical inorganic particle (Seahostar KEP 50) dispersion solution was changed to the following.

Preparation of Spherical Inorganic Particle Dispersion Solution

Spherical inorganic particle dispersion solution [c] was prepared according to the following formulation.

| | |
|---|---|
| Isopropyl alcohol | 93.54 weight parts |
| Silane coupling agent KBM 903 (trade name, manufactured by Shinetsu silicone Co.) | 5.53 weight parts |
| Seahostar KEP 50 (amorphous spherical silica; average particle diameter: 0.5 μm trade name, manufactured by Nippon Shokubai Co., Ltd) | 86.00 weight parts |

The mixture having the above formulation was mixed for 10 minutes, and further the following was added.

| Diacetone alcohol | 252.93 weight parts |

A mixture solution of the above was dispersed while stirring for 3 hour on an ice bath by means of the ultrasonic wave homogenizer "SONIFIER 450 (trade name, manufactured by BRANSON Co., Ltd.)"

2.97 g of compound 6-1 was added to 440 g of the above-described dispersion solution, and the resulting mixture is mixed and stirred for 30 minutes.

As is apparent from Table 1, it is found that an excellent state of the coated surface is attained, and further a secure magnetic input/output performance is provided, by the present invention, and therefore the improvement effect according to the present invention is outstanding.

Further, Table 1 shows that it is preferable to add the anionic surfactant for use in the present invention to a lubricant wax dispersion solution, so as to previously adsorb the anionic surfactant onto the surface of the dispersed lubricant, and thereafter to add the resultant dispersion solution into an overcoat solution, from the advantage in that, even though the amount of the surfactant to be used is small, an improvement effect can be fully exhibited.

Further, it is found that a suitable amount of the anionic surfactant to be used is 0.1% or more, from the viewpoints of both the state of the coated surface and the magnetic recording performance, and 30 % or less, from the viewpoint of a sufficient lubrication property being obtained, based on the total weight of the lubricant wax dispersion, respectively.

Lastly, the contents of the silver halide photographic light-sensitive material and a color processing method, for use in the present invention, are described in detail below.

On the surface of a support opposite to the magnetic recording layer-coating side of the magnetic recording medium of the present invention, each of the layers having the following compositions which are described in Japanese patent application No. 10-111196, was multiply coated to obtain a multi-layer color photographic light-sensitive material. A silver halide photographic light-sensitive material comprising a transparent magnetic recording medium having excelled in both the state of coated surface and the magnetic recording performance, can be provided according to the present invention.

Color Light-sensitive Material

Each of layers having the below-shown compositions were multiply coated on a support (base), which had been provided an undercoat, to prepare a multi-layer color light-sensitive material.

Compositions of Light-sensitive Layers

Main materials used in each layer were classified as follows:
ExC: Cyan coupler
ExM: Magenta coupler
ExY: Yellow coupler
ExS: Sensitizing dye
UV:Ultraviolet ray absorbent
HBS: High-boiling organic solvent
H: Gelatin hardening agent Figures corresponding to each component represents the coating amount in terms of $g/m^2$, and for silver halide in terms of silver. However, with respect to sensitizing dyes, the coating amount per mol of silver halide in the same layer, is shown in terms of mol.

First Layer (First halation-preventing layer)

| Black colloidal silver | silver 0.155 |
| Silver bromoiodide emulsion P | silver 0.01 |
| Gelatin | 0.87 |
| ExC-1 | 0.002 |
| ExC-3 | 0.002 |
| Cpd-2 | 0.001 |
| HBS-1 | 0.004 |
| HBS-2 | 0.002 |

Second Layer (Second halation-preventing layer)

| Black colloidal silver | silver 0.066 |
| Gelatin | 0.407 |
| ExM-1 | 0.050 |
| ExF-1 | $2.0 \times 10^{-3}$ |
| HBS-1 | 0.074 |
| Solid disperse dye ExF-2 | 0.015 |
| Solid disperse dye ExF-3 | 0.020 |

Third Layer (Intermediate layer)

| Silver bromoiodide emulsion O | silver 0.020 |
| ExC-2 | 0.022 |
| Polyethyl acrylate latex | 0.085 |
| Gelatin | 0.294 |

Fourth Layer (Low-sensitivity red-sensitive emulsion layer)

| Silver bromoiodide emulsion A | silver 0.323 |
| ExS-1 | $5.5 \times 10^{-4}$ |
| ExS-2 | $1.0 \times 10^{-5}$ |
| ExS-3 | $2.4 \times 10^{-4}$ |
| ExC-1 | 0.109 |
| ExC-3 | 0.044 |
| ExC-4 | 0.072 |
| ExC-5 | 0.011 |
| ExC-6 | 0.003 |
| Cpd-2 | 0.025 |
| Cpd-4 | 0.025 |
| HBS-1 | 0.17 |
| Gelatin | 0.80 |

Fifth Layer (Medium-sensitivity red-sensitive emulsion layer)

| Silver bromoiodide emulsion B | silver 0.28 |
| Silver bromoiodide emulsion C | silver 0.54 |
| ExS-1 | $5.0 \times 10^{-4}$ |
| ExS-2 | $1.0 \times 10^{-5}$ |
| ExS-3 | $2.0 \times 10^{-4}$ |
| ExC-1 | 0.14 |
| ExC-2 | 0.026 |

-continued

| | |
|---|---|
| ExC-3 | 0.020 |
| ExC-4 | 0.12 |
| ExC-5 | 0.016 |
| ExC-6 | 0.007 |
| Cpd-2 | 0.036 |
| Cpd-4 | 0.028 |
| HBS-1 | 0.16 |
| Gelatin | 1.18 |

Sixth Layer (High-sensitivity red-sensitive emulsion layer)

| | |
|---|---|
| Silver bromoiodide emulsion D | silver 1.47 |
| ExS-1 | $3.7 \times 10^{-4}$ |
| ExS-2 | $1 \times 10^{-5}$ |
| ExS-3 | $1.8 \times 10^{-4}$ |
| ExC-1 | 0.18 |
| ExC-3 | 0.07 |
| ExC-6 | 0.029 |
| ExC-7 | 0.010 |
| ExY-5 | 0.008 |
| Cpd-2 | 0.046 |
| Cpd-4 | 0.077 |
| HBS-1 | 0.25 |
| HBS-2 | 0.12 |
| Gelatin | 2.12 |

Seventh Layer (Intermediate layer)

| | |
|---|---|
| Cpd-1 | 0.089 |
| Solid disperse dye ExF-4 | 0.030 |
| HBS-1 | 0.050 |
| Polyethyl acrylate latex | 0.83 |
| Gelatin | 0.84 |

Eighth Layer (Layer to provide interlayer effect to red-sensitive layers)

| | |
|---|---|
| Silver bromoiodide emulsion E | silver 0.560 |
| ExS-6 | $1.7 \times 10^{-4}$ |
| ExS-10 | $4.6 \times 10^{-4}$ |
| Cpd-4 | 0.030 |
| ExM-2 | 0.096 |
| ExM-3 | 0.028 |
| ExY-1 | 0.031 |
| HBS-1 | 0.085 |
| HBS-3 | 0.003 |
| Gelatin | 0.58 |

Ninth Layer (Low-sensitivity green-sensitive emulsion layer)

| | |
|---|---|
| Silver bromoiodide emulsion F | silver 0.39 |
| Silver bromoiodide emulsion G | silver 0.28 |
| Silver bromoiodide emulsion H | silver 0.35 |
| ExS-4 | $2.4 \times 10^{-5}$ |
| ExS-5 | $1.0 \times 10^{-4}$ |
| ExS-6 | $3.9 \times 10^{-4}$ |
| ExS-7 | $7.7 \times 10^{-5}$ |

-continued

| | |
|---|---|
| ExS-8 | $3.3 \times 10^{-4}$ |
| ExM-2 | 0.36 |
| ExM-3 | 0.045 |
| HBS-1 | 0.28 |
| HBS-3 | 0.01 |
| HBS-4 | 0.27 |
| Gelatin | 1.39 |

Tenth Layer (Middle-sensitivity green-sensitive emulsion layer)

| | |
|---|---|
| Silver bromoiodide emulsion I | silver 0.45 |
| ExS-4 | $5.3 \times 10^{-5}$ |
| ExS-7 | $1.5 \times 10^{-4}$ |
| ExS-8 | $6.3 \times 10^{-4}$ |
| ExC-6 | 0.009 |
| ExM-2 | 0.031 |
| ExM-3 | 0.029 |
| ExY-1 | 0.006 |
| ExM-4 | 0.028 |
| HBS-1 | 0.064 |
| HBS-3 | $2.1 \times 10^{-3}$ |
| Gelatin | 0.44 |

Eleventh Layer (High-sensitivity green-sensitive emulsion layer)

| | |
|---|---|
| Silver bromoiodide emulsion I | silver 0.19 |
| Silver bromoiodide emulsion J | silver 0.80 |
| ExS-4 | $4.1 \times 10^{-5}$ |
| ExS-7 | $1.1 \times 10^{-4}$ |
| ExS-8 | $4.9 \times 10^{-4}$ |
| ExC-6 | 0.004 |
| ExM-1 | 0.016 |
| ExM-3 | 0.036 |
| ExM-4 | 0.020 |
| ExM-5 | 0.004 |
| ExY-5 | 0.003 |
| ExM-2 | 0.013 |
| Cpd-3 | 0.004 |
| Cpd-4 | 0.007 |
| HBS-1 | 0.18 |
| Poly(ethyl acrylate)latex | 0.099 |
| Gelatin | 1.11 |

Twelfth Layer (Yellow filter layer)

| | |
|---|---|
| Yellow colloidal silver | silver 0.047 |
| Cpd-1 | 0.16 |
| Solid disperse dye ExF-5 | 0.020 |
| Solid disperse dye ExF-6 | 0.020 |
| Oil-soluble dye ExF-7 | 0.010 |
| HBS-1 | 0.082 |
| Gelatin | 1.057 |

Thirteenth Layer (Low-sensitivity blue-sensitive emulsion layer)

| | |
|---|---|
| Silver bromoiodide emulsion K | silver 0.18 |
| Silver bromoiodide emulsion L | silver 0.20 |
| Silver bromoiodide emulsion M | silver 0.07 |
| ExS-9 | $4.4 \times 10^{-4}$ |
| ExS-10 | $4.0 \times 10^{-4}$ |
| ExC-1 | 0.041 |
| ExC-8 | 0.012 |
| ExY-1 | 0.035 |
| ExY-2 | 0.71 |
| ExY-3 | 0.10 |
| ExY-4 | 0.005 |
| Cpd-2 | 0.10 |
| Cpd-3 | $4.0 \times 10^{-3}$ |
| HBS-1 | 0.24 |
| Gelatin | 1.41 |

Fourteenth Layer (High-sensitivity blue-sensitive emulsion layer)

| | |
|---|---|
| Silver bromoiodide emulsion N | silver 0.75 |
| ExS-9 | $3.6 \times 10^{-4}$ |
| ExC-1 | 0.013 |
| ExY-2 | 0.31 |
| ExY-3 | 0.05 |
| ExY-6 | 0.062 |
| Cpd-2 | 0.075 |
| Cpd-3 | $1.0 \times 10^{-3}$ |
| HBS-1 | 0.10 |
| Gelatin | 0.91 |

Fifteenth Layer (First protective layer)

| | |
|---|---|
| Silver bromoiodide emulsion O | silver 0.30 |
| UV-1 | 0.21 |
| UV-2 | 0.13 |
| UV-3 | 0.20 |
| UV-4 | 0.025 |
| HBS-1 | 0.12 |
| HBS-4 | $5.0 \times 10^{-2}$ |
| Gelatin | 2.3 |

Sixteenth Layer (Second protective layer)

| | |
|---|---|
| H-1 | 0.40 |
| B-1 (diameter: 1.7 $\mu$m) | $5.0 \times 10^{-2}$ |
| B-2 (diameter: 1.7 $\mu$m) | 0.15 |
| B-3 | 0.05 |
| S-1 | 0.20 |
| Gelatin | 0.75 |

Further, in order to improve preservability, processability, pressure resistance, antimold and antibacterial properties, antistatic property, and coating property, compounds of W-1 to W-5, B-4 to B-6, and F-1 to F-8, and salts of iron, lead, gold, platinum, palladium, iridium, ruthenium, and rhodium, were suitably added in each layer. Further, $8.5 \times 10^{-3}$ gram and $7.9 \times 10^{-3}$ gram, per 1 mol of silver halide, of calcium were added to the eighth layer and eleventh layer, respectively, in the form of calcium nitrate aqueous solution to prepare the sample.

The AgI content, the particle size, the surface iodo content (percentage), and the like, of the above emulsions as indicated by an abbreviation, are shown in Table 2. The surface iodo content can be measured by the XPS as described below. A sample was cooled to −115° C. in a vacuum of 1×10 torr or less, and was irradiated by MgKα as a probe X ray at the X ray source voltage of 8 kV and the X ray electric current of 20 mA, and $Ag_3d_{5/2}$, $Br_3d$, and $I_3d_{5/2}$ electrons were measured. The integrated intensity of the measured peak was corrected with a sensitivity factor, and based on these intensity ratio, the surface iodo content was obtained.

TABLE 2

| Light-sensitive silver halide emulsion | Average iodo content (mol %) | Coefficient of variation concerning iodo distribution among particles | Average particle size (diameter corresponding to sphere*1; $\mu$m) | Coefficient of variation of diameter corresponding to sphere (%) | Diameter of projected area (diameter corresponding to circle*2; $\mu$m) | Ratio of diameter to thickness | Surface iodo content (mol %) | Shape of particle |
|---|---|---|---|---|---|---|---|---|
| Emulsion A | 3.9 | 20 | 0.37 | 19 | 0.40 | 2.7 | 2.3 | Tabular grain |
| Emulsion B | 5.1 | 17 | 0.52 | 21 | 0.67 | 5.2 | 3.5 | Tabular grain |
| Emulsion C | 7.0 | 18 | 0.86 | 22 | 1.27 | 5.9 | 5.2 | Tabular grain |
| Emulsion D | 4.2 | 17 | 1.00 | 18 | 1.53 | 6.5 | 2.8 | Tabular grain |
| Emulsion E | 7.2 | 22 | 0.87 | 22 | 1.27 | 5.7 | 5.3 | Tabular grain |
| Emulsion F | 2.6 | 18 | 0.28 | 19 | 0.28 | 1.3 | 1.7 | Tabular grain |
| Emulsion G | 4.0 | 17 | 0.43 | 19 | 0.58 | 3.3 | 2.3 | Tabular grain |
| Emulsion H | 5.3 | 18 | 0.52 | 17 | 0.79 | 6.5 | 4.7 | Tabular grain |
| Emulsion I | 5.5 | 16 | 0.73 | 15 | 1.03 | 5.5 | 3.1 | Tabular grain |
| Emulsion J | 7.2 | 19 | 0.93 | 18 | 1.45 | 5.5 | 5.4 | Tabular grain |
| Emulsion K | 1.7 | 18 | 0.40 | 16 | 0.52 | 6.0 | 2.1 | Tabular grain |
| Emulsion L | 8.7 | 22 | 0.64 | 18 | 0.86 | 6.3 | 5.8 | Tabular grain |
| Emulsion M | 7.0 | 20 | 0.51 | 19 | 0.82 | 5.0 | 4.9 | Tabular grain |
| Emulsion N | 6.5 | 22 | 1.07 | 24 | 1.52 | 7.3 | 3.2 | Tabular grain |

TABLE 2-continued

| Light-sensitive silver halide emulsion | Average iodo content (mol %) | Coefficient of variation concerning iodo distribution among particles | Average particle size (diameter corresponding to sphere*1; μm) | Coefficient of variation of diameter corresponding to sphere (%) | Diameter of projected area (diameter corresponding to circle*2; μm) | Ratio of diameter to thickness | Surface iodo content (mol %) | Shape of particle |
|---|---|---|---|---|---|---|---|---|
| Emulsion O | 1.0 | — | 0.07 | — | 0.07 | 1.0 | — | Uniform structure |
| Emulsion P | 0.9 | — | 0.07 | — | 0.07 | 1.0 | — | Uniform structure |

Note:
*1The "diameter corresponding to sphere" means an average of diameters of spheres having volumes equal to the respective particle volumes.
*2The "diameter corresponding to circle" means an average of diameters of circles having areas equal to the respective projected areas of the particles.

In Table 2,
(1) Emulsions L to O were subjected to reduction sensitization using thiourea dioxide and thiosulfonic acid at the time of preparation of particles, according to the Example described in JP-A-2-191938.
(2) Emulsions A to O were subjected to gold sensitization, sulfur sensitization and selenium sensitization, under the presence of respective sensitizing dyes described in each layer and sodium thiocyanate, according to Example described in JP-A-3-237450.
(3) At the preparation of tabular particles, low-molecular-weight gelatin was used, according to Example described in JP-A-1-158426.
(4) Tabular particles were observed dislocation lines by a high-pressure electron microscope, as described in JP-A-3-237450.

Preparation of a Dispersion of an Organic Solid Disperse Dye

ExF-2 as described below was dispersed according to the following method. That is, water (21.7 ml), a 5% aqueous solution of sodium p-octylphenoxyethoxyethoxyethanesulfonate (3 ml), and a 5% aqueous solution of p-octylphenoxypolyoxyethylene ether (polymerization degree 10) (0.5 g) were added to a pot mill (700 ml), and Dye ExF-2 (5.0 g) and zirconium oxide beads (diameter 1 mm) (500 ml) were further added thereto, and then the mixture was dispersed for 2 hours. For the dispersion, a BO-type vibration ball mill, manufactured by Chuo Koki Co., Ltd., was employed. After the dispersion, the mixture was taken out and added to 8 g of a 12.5% aqueous gelatin solution, and then the beads were removed by filtration, to obtain a gelatin dispersion of the dye. The average particle diameter of the dye in the form of fine particles was 0.44 μm.

In the similar manner, solid dispersions of ExF-3, ExF-4, and ExF-6 were obtained. The average particle diameter of these dyes in the form of fine particles was 0.24 μm, 0.45 μm, and 0.52 μm, respectively. On the other hand, ExF-5 was dispersed according to the dispersion method comprising microprecipitation, as described in Example 1 of EP-A-549,489. The average particle diameter of the dye was 0.06 μm.

Compounds used in each layers described above were shown in the following.

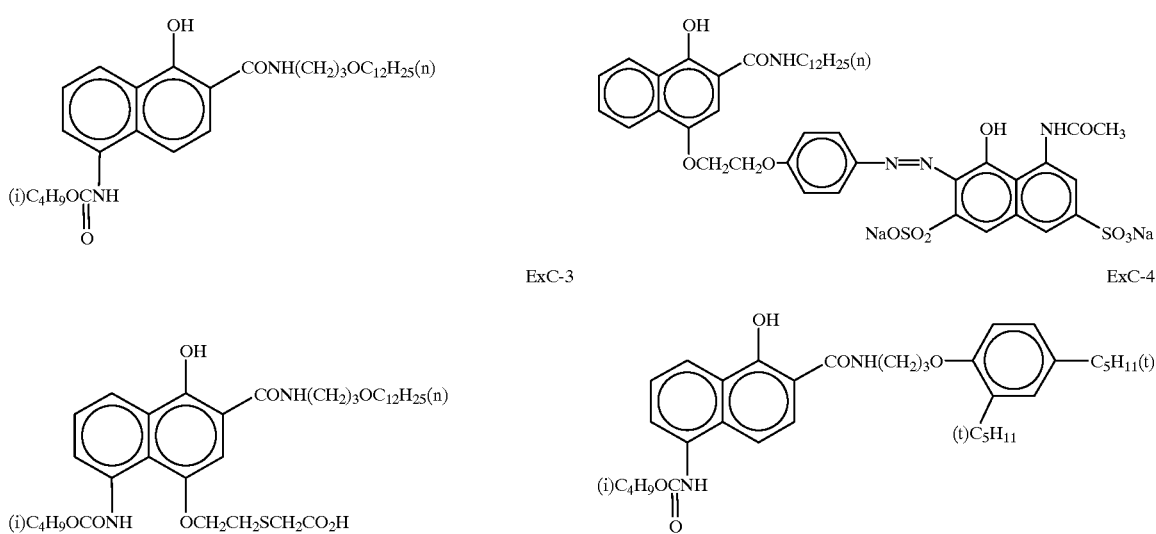

-continued
ExC-5
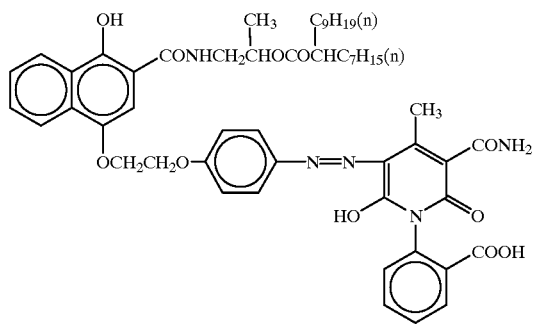
ExC-6
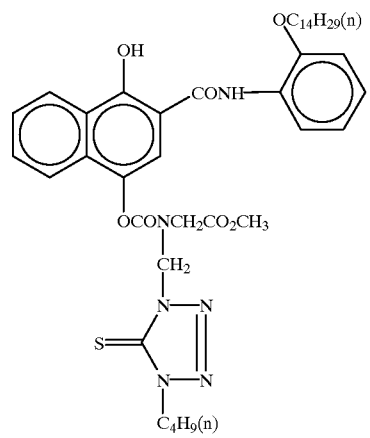
ExC-7
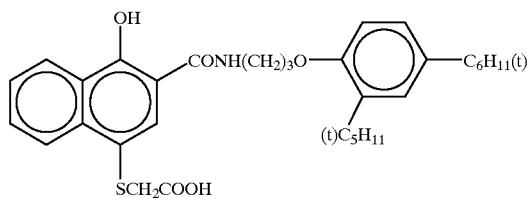
ExC-8
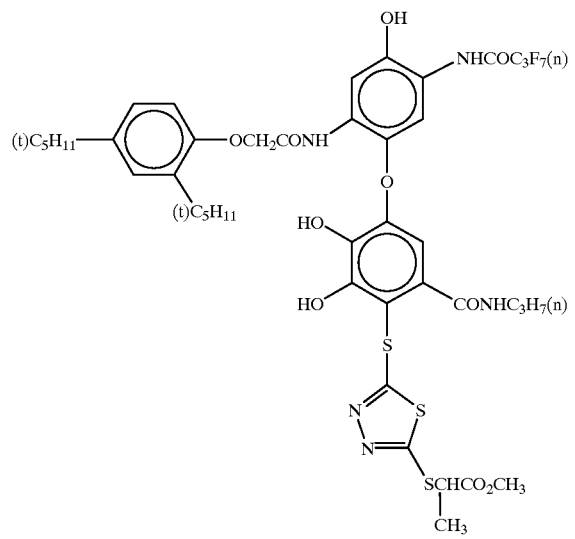
ExM-1
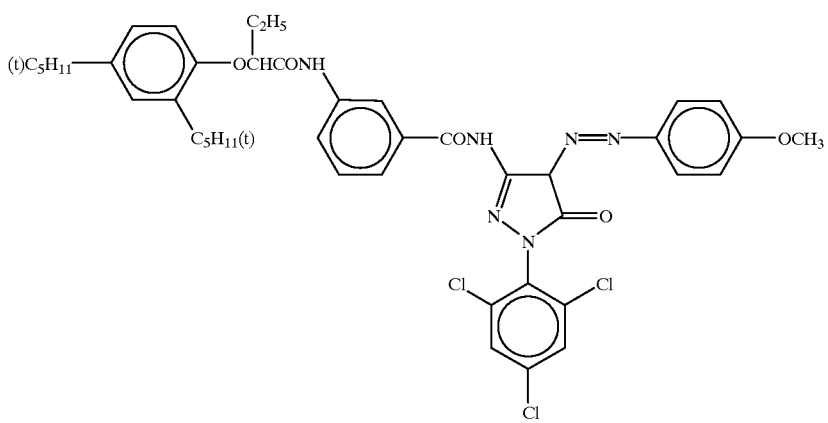

-continued
ExM-2
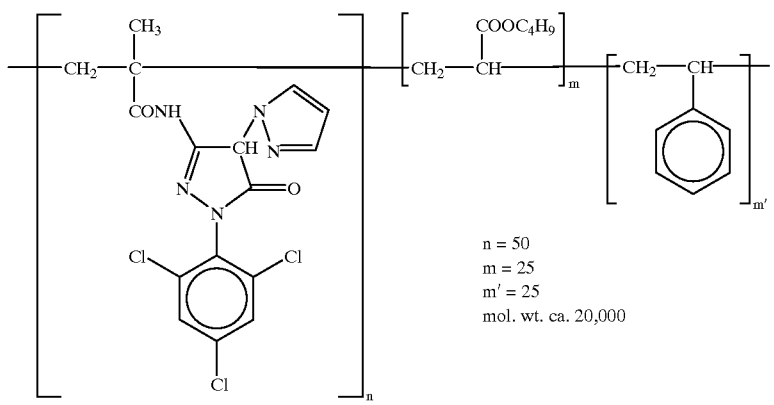
n = 50
m = 25
m' = 25
mol. wt. ca. 20,000
ExM-3
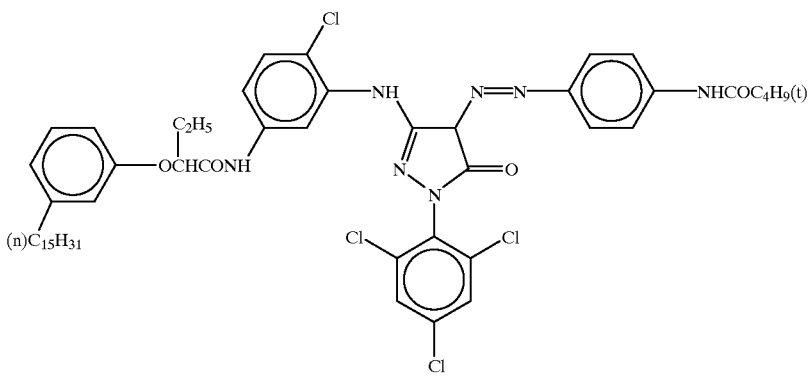
ExM-4
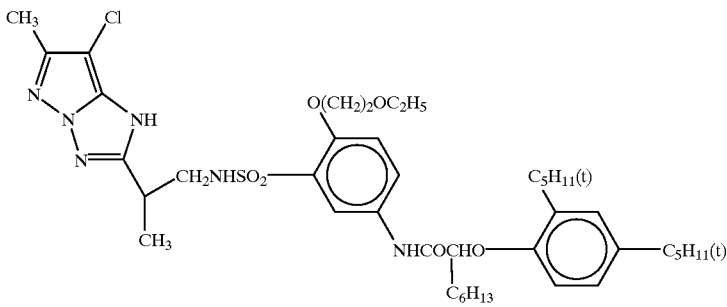
ExM-5
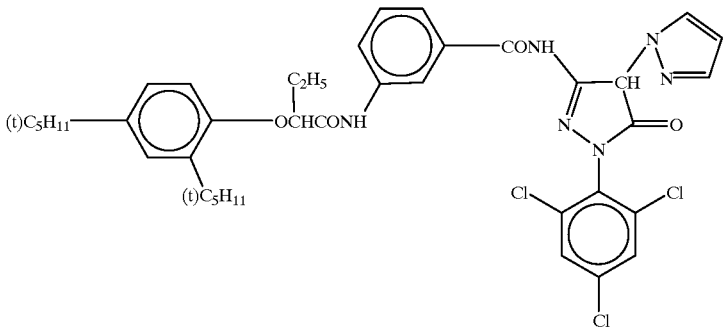

ExY-1
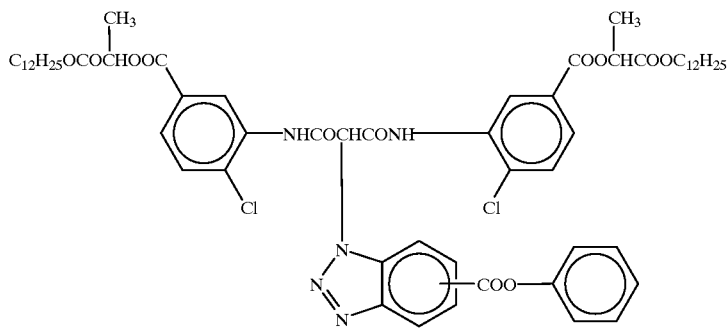
ExY-2
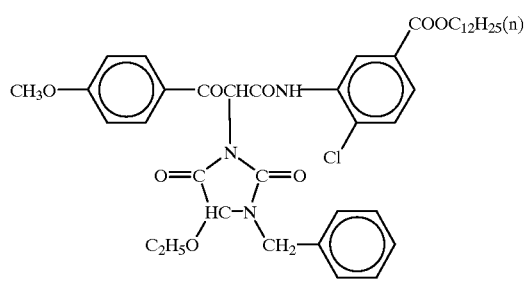
ExY-3
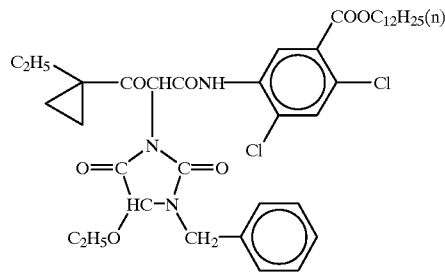
ExY-4
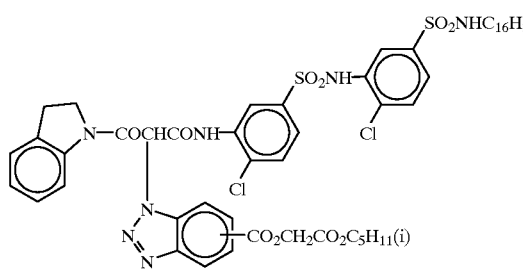
ExY-5
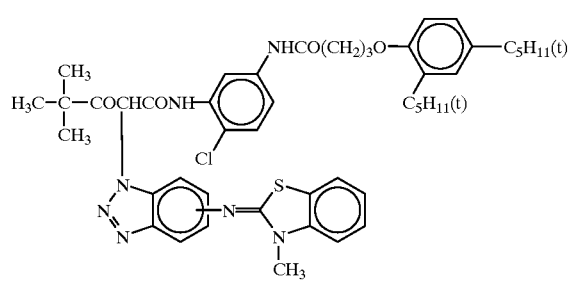
ExY-6
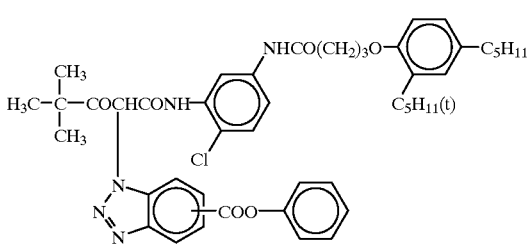
ExF-1
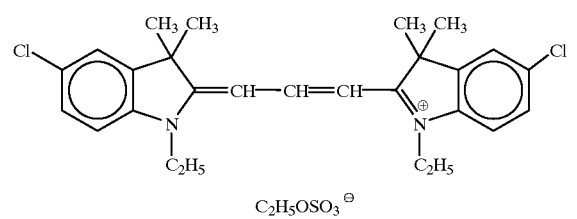
ExF-2
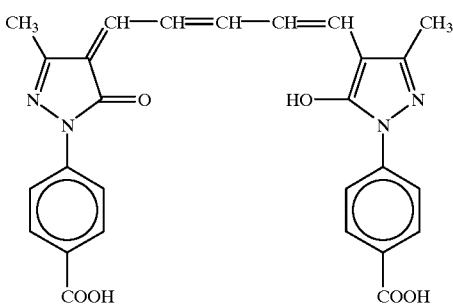
ExF-3
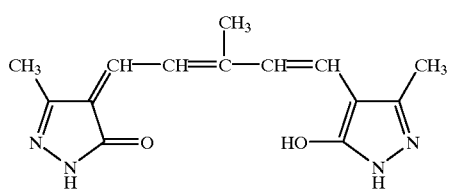

ExF-4
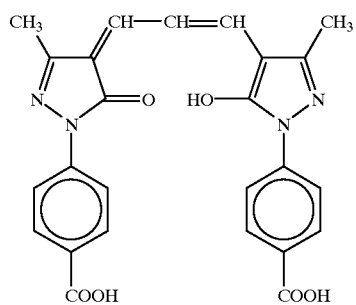
ExF-5
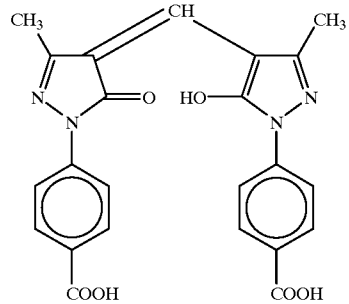
ExF-6
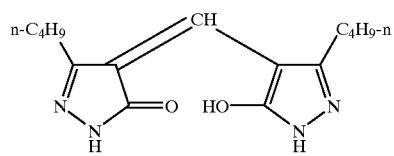
ExF-7
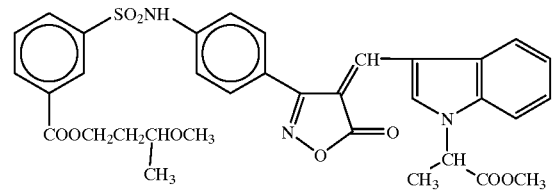
Cpd-1
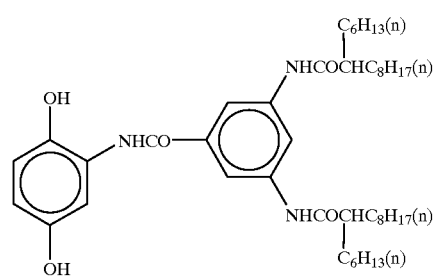
Cpd-2
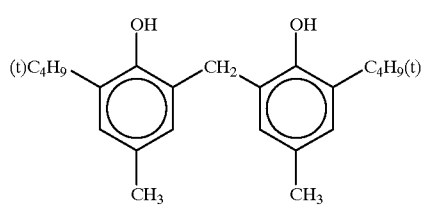
Cpd-3
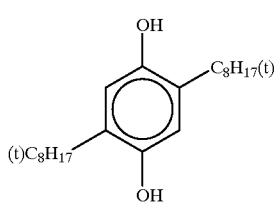
Cpd-4
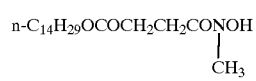
UV-1
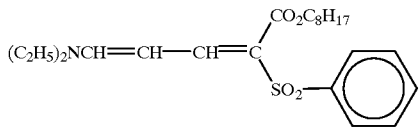
UV-2
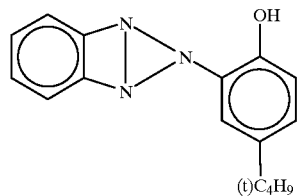
UV-3
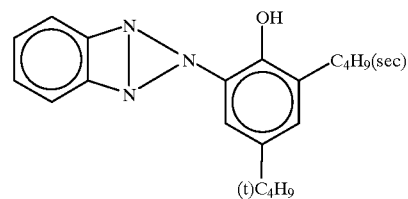
UV-4
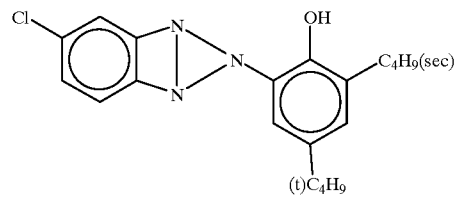
HBS-1
Tricresyl phosphate
HBS-2
Di-n-butyl phthalate -continued
HBS-3
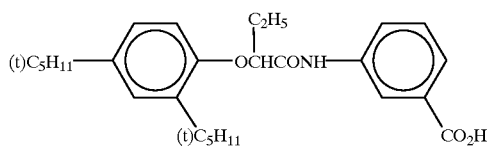
HBS-4
Tri(2-ethylhexyl)phosphate
ExS-1
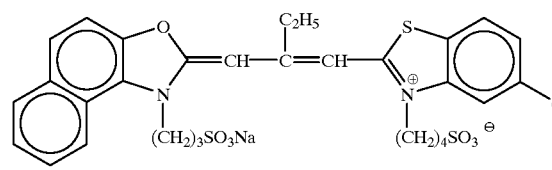
ExS-2
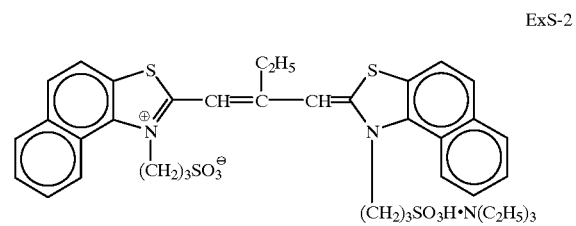
ExS-3
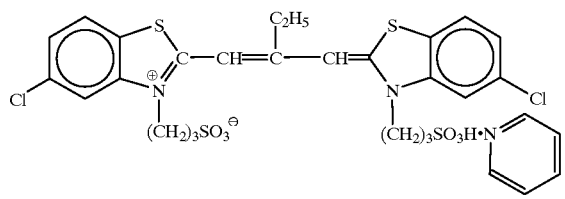
ExS-4
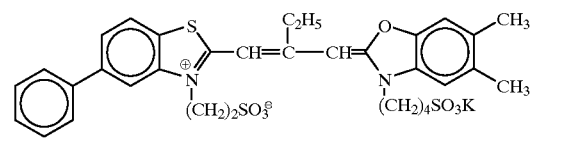
ExS-5
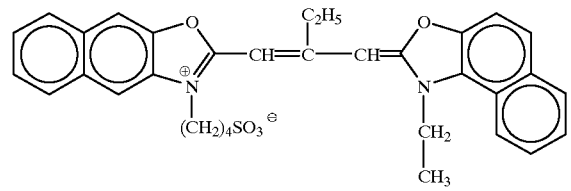
ExS-6
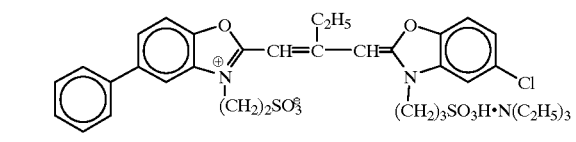
ExS-7
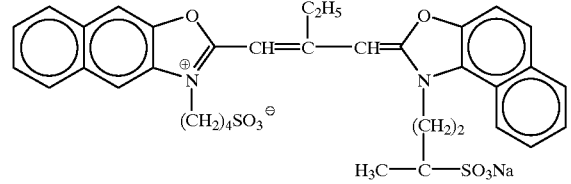
ExS-8
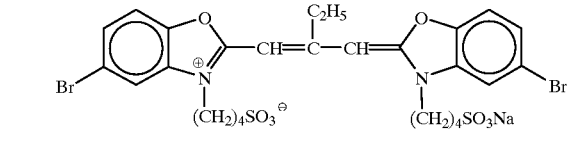
ExS-9
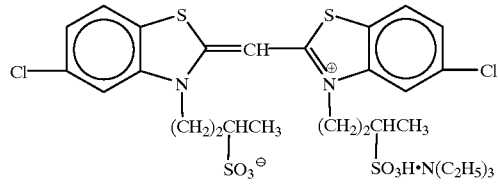
ExS-10
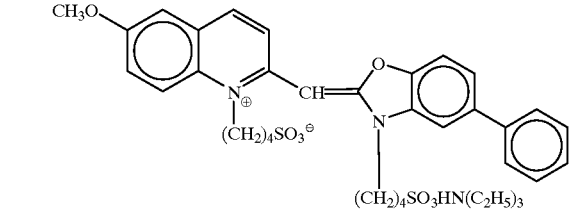
S-1
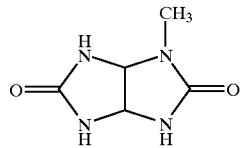
H-1
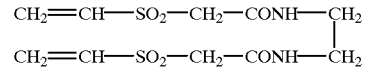

-continued
B-1
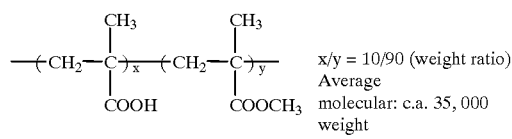
x/y = 10/90 (weight ratio)
Average molecular: c.a. 35,000 weight
B-2
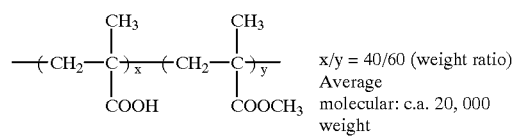
x/y = 40/60 (weight ratio)
Average molecular: c.a. 20,000 weight
B-3
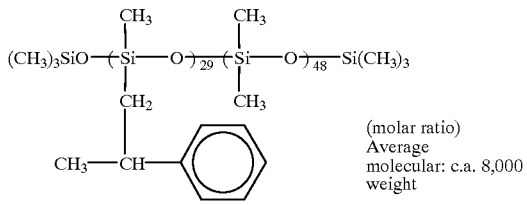
(molar ratio)
Average molecular: c.a. 8,000 weight
B-4
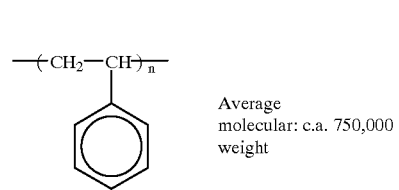
Average molecular: c.a. 750,000 weight
B-5
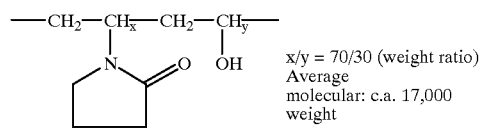
x/y = 70/30 (weight ratio)
Average molecular: c.a. 17,000 weight
B-6
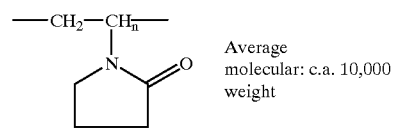
Average molecular: c.a. 10,000 weight
W-1
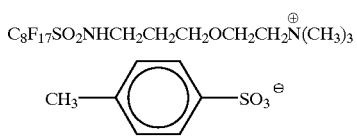
W-3
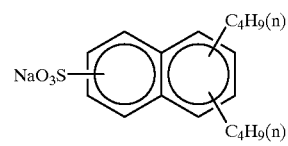
W-4
W-5
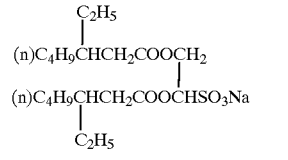
F-1
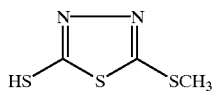
F-2
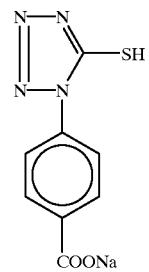
F-3
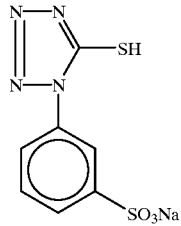
F-4
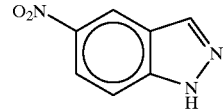
F-5
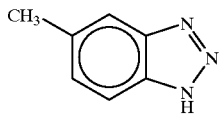
F-6
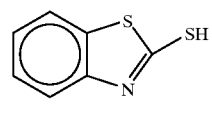

F-7

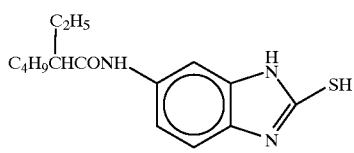

F-8

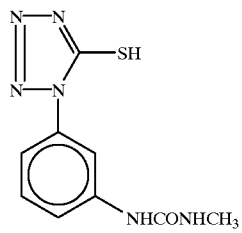

Color development processing was conducted using an automatic processor in the way described below, until the accumulative total of the replenishing rate of a solution reached 3 times the tank volume of its mother solution.

[Processing method]

| Step | Processing time | temperature | Replenishing rate | Tank Volume |
|---|---|---|---|---|
| Color-Developing | 3 min 15 sec | 38° C. | 33 ml | 20 liter |
| Bleaching | 6 min 30 sec | 38° C. | 25 ml | 40 liter |
| Washing | 2 min 10 sec | 24° C. | 1200 ml | 20 liter |
| Fixing | 4 min 20 sec | 38° C. | 25 ml | 30 liter |
| Washing (1) | 1 min 05 sec | 24° C. | | 10 liter |
| Washing (2) | 1 min 00 sec | 24° C. | 1200 ml | 10 liter |
| Stabilizing | 1 min 05 sec | 38° C. | 25 ml | 10 liter |
| Drying | 4 min 20 sec | 55° C. | | |

Note: Replenishing rate defines an amount per 1 m of the light-sensitive material having 35-mm width. Washing (1) was carried out in a counter-current mode from tank (2) to tank (1).

In the following, the constitution of the processing solutions were shown.

| | Mother Solution (g) | Replenisher (g) |
|---|---|---|
| (Color-developer) | | |
| Diethylenetriaminepentaacetic acid | 1.0 | 1.1 |
| 1-Hydroxyethylidene-1,1-diphosphonic acid | 3.0 | 3.2 |
| Sodium sulfite | 4.0 | 4.4 |
| Potassium carbonate | 30.0 | 37.0 |
| Potassium bromide | 1.4 | 0.7 |
| Potassium iodide | 1.5 mg | — |
| Hydroxylamine sulfate | 2.4 | 2.8 |
| 4-[N-ethyl-β-hydroxyethyl-amino]-2-methylaniline sulfate | 4.5 | 5.5 |
| Water to make | 1.0 liter | 1.0 liter |
| pH | 10.05 | 10.10 |
| (Bleaching solution) | | |
| Ethylenediaminetetraacetic acid iron(III) sodium trihydroxide | 100.0 | 120.0 |
| Disodium ethylenediaminetetraacetate | 10.0 | 10.0 |
| Ammonium bromide | 140.0 | 160.0 |
| Ammonium nitrate | 30.0 | 35.0 |
| Aqueous ammonia (27%) | 6.5 ml | 4.0 ml |
| Water to make | 1.0 liter | 1.0 liter |
| pH | 6.0 | 5.7 |

| | Mother Solution (g) | Replenisher (g) |
|---|---|---|
| (Fixing solution) | | |
| Disodium ethylenediaminetetraacetate | 0.5 | 0.7 |
| Sodium sulfite | 7.0 | 8.0 |
| Sodium bisulfite | 5.0 | 5.5 |
| Ammonium thiosulfate aqueous solution (70%) | 170.0 ml | 200.0 ml |
| Water to make | 1.0 liter | 1.0 liter |
| pH | 6.7 | 6.6 |
| (Stabilizing solution) | | |
| Formalin (37%) | 2.0 ml | 3.0 ml |
| Polyoxyethylene-p-monononylphenyl-ether (av. polymerization degree: 10) | 0.3 | 0.45 |
| Disodium ethylenediaminetetraacetate | 0.05 | 0.08 |
| Water to make | 1.0 liter | 1.0 liter |
| pH | 5.0–8.0 | 5.0–8.0 |

OTHERS SAMPLES OF THE INVENTION

With respect to each of the above-described samples of the present invention, such modifications were made that a coating amount of the magnetic substance in the second layer was reduced by 0.6 time, the emulsion layers were changed to the same reversal color emulsion layers as Sample 101 in Example 1 of JP-A-2-854, and moreover, the processing was carried out by a processing method for the color reversal light-sensitive material as shown in Example 1 of JP-A-2-854. Measurement was carried out in the same manner as in the above-described samples, and as a result, exactly the same improvement effects (results) were obtained, so that color reversal light-sensitive material, which contain a transparent magnetic recording medium, that is excellent in a state of coated surface and magnetic input/output performance compatibility, was obtained.

Having described our invention as related to the present embodiments, it is our intention that the invention not be limited by any of the details of the description, unless otherwise specified, but rather be construed broadly within its spirit and scope as set out in the accompanying claims.

What we claim is:

1. A transparent magnetic recording medium comprising at least one magnetic recording layer containing ferromagnetic particles, on a support, wherein an overcoat solution which comprises at least one kind of lubricant wax dispersion and at least one kind of anionic surfactant in an amount of 0.1% to 30%, based on the total weight of the lubricant wax dispersion, is coated on the at least one magnetic recording layer.

2. The transparent magnetic recording medium as claimed in claim 1, wherein the lubricant wax dispersion is a higher fatty acid ester-lubricant dispersion.

3. The transparent magnetic recording medium as claimed in claim 2, wherein the anionic surfactant is the following compound 6-1, and the lubricant wax dispersion comprises a higher fatty acid ester-lubricant represented by the following formula (1) and a dispersing agent represented by the following formula (3):

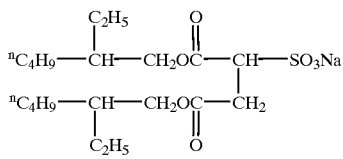

6-1

$R^1COOR^2$  Formula (1)

In formula (1), $R^1$ and $R^2$ each represent a straight-chain aliphatic hydrocarbon group having from 15 to 50 carbon atoms, wherein at least one of $R^1$ and $R^2$ has at least one of —OH, and the total carbon atoms of the compound represented by formula (1) are from 40 to 80:

$R^6O(CH_2CH_2O)_aD$  Formula (3)

In formula (3), $R^6$ represents a straight-chain aliphatic hydrocarbon group having from 30 to 60 carbon atoms, and a is from 5 to 30, and D represents a hydrogen atom or an alkyl group.

4. The transparent magnetic recording medium as claimed in claim 1 wherein the anionic surfactant is allowed to be previously adsorbed on the surface of the dispersed wax lubricant in the lubricant wax dispersion solution.

5. The transparent magnetic recording medium as claimed in claim 1, wherein the overcoat solution comprises at least one kind of spherical inorganic particles having a Mohs' hardness of 6 to 8 and/or at least one kind of spherical organic high-molecular particles.

6. The transparent magnetic recording medium as claimed in claim 5, wherein the spherical inorganic particle is an amorphous silica particle, and the spherical organic high-molecular particle is a polysiloxane particle.

7. The transparent magnetic recording medium as claimed in claim 1, wherein the wax lubricant is previously dispersed by a solvent comprising cyclohexanone and the overcoat solution contains at least diacetone alcohol (DAA) as its solvent and the binder of the magnetic recording layer is diacetyl cellulose (DAC).

8. The transparent magnetic recording medium as claimed in claim 1, wherein the transparent magnetic recording layer contains inorganic particles having an average primary particle size of from 1 nm to 50 nm in an amount of from 10 mg/m² to 200 mg/m².

9. The transparent magnetic recording medium as claimed in claim 8, wherein the inorganic particle having an average primary particle size of from 1 nm to 50 nm is colloidal silica particle.

10. The transparent magnetic recording medium as claimed in claim 5, wherein the transparent magnetic recording layer contains alumina abrasives having substantially higher particle size than the any average height of the surface protrusion of said spherical inorganic particles and said spherical organic high-molecular particles.

11. A silver halide photographic light-sensitive material having a transparent magnetic recording layer containing ferromagnetic particles, wherein an overcoat solution which comprises at least one kind of lubricant wax dispersion and at least one kind of anionic surfactant in an amount of 0.1% to 30%, based on the total weight of the lubricant wax dispersion, is coated on the magnetic recording layer, which comprises at least one light-sensitive silver halide emulsion layer provided on one side of a support opposite to the transparent magnetic recording layer.

12. The silver halide photographic light-sensitive material as claimed in claim 11, wherein the lubricant wax dispersion is a higher fatty acid ester-lubricant dispersion.

13. The silver halide photographic light-sensitive material as claimed in claim 12, wherein the anionic surfactant is the following compound 6-1, and the lubricant wax dispersion comprises a higher fatty acid ester-lubricant represented by the following formula (1) and a dispersing agent represented by the following formula (3):

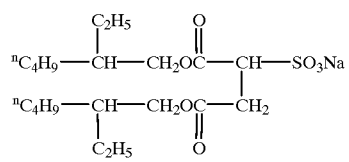

6-1

$R^1COOR^2$  Formula (1)

In formula (1), $R^1$ and $R^2$ each represent a straight-chain aliphatic hydrocarbon group having from 15 to 50 carbon atoms, wherein at least one of $R^1$ and $R^2$ has at least one of —OH, and the total carbon atoms of the compound represented by formula (1) are from 40 to 80:

$R^6O(CH_2CH_2O)_aD$  Formula (3)

In formula (3), $R^6$ represents a straight-chain aliphatic hydrocarbon group having from 30 to 60 carbon atoms, and a is from 5 to 30, and D represents a hydrogen atom or an alkyl group.

14. The silver halide photographic light-sensitive material as claimed in claim 11, wherein the anionic surfactant is allowed to be previously adsorbed on the surface of the dispersed wax lubricant in the lubricant wax dispersion solution.

15. The silver halide photographic light-sensitive material as claimed in claim 11, wherein the overcoat solution comprises at least one kind of spherical inorganic particles having a Mohs' hardness of 6 to 8 and/or at least one kind of spherical organic high-molecular particles.

16. The silver halide photographic light-sensitive material as claimed in claim 15, wherein the spherical inorganic particle is an amorphous silica particle, and the spherical organic high-molecular particle is a polysiloxane particle.

17. The silver halide photographic light-sensitive material as claimed in claim 11, wherein the wax lubricant is previously dispersed by a solvent comprising cyclohexanone and the overcoat solution contains at least diacetone alcohol (DAA) as its solvent and the binder of the magnetic recording layer is diacetyl cellulose (DAC).

18. The silver halide photographic light-sensitive material as claimed in claim 11, wherein the transparent magnetic recording layer contains inorganic particles having an average primary particle size of from 1 nm to 50 nm in an amount of from 10 mg/m² to 200 mg/m².

19. The silver halide photographic light-sensitive material as claimed in claim 18, wherein the inorganic particle having an average primary particle size of from 1 nm to 50 nm is colloidal silica particle.

20. The silver halide photographic light-sensitive material as claimed in claim 15, wherein the transparent magnetic recording layer contains alumina abrasives having substantially higher particle size than the any average height of the surface protrusion of said spherical inorganic particles and said spherical organic high-molecular particles.

* * * * *

UNITED STATES PATENT AND TRADEMARK OFFICE
CERTIFICATE OF CORRECTION

PATENT NO. : 6,303,280 B1
DATED : October 16, 2001
INVENTOR(S) : Naohiro Matsunaga et al.

It is certified that error appears in the above-identified patent and that said Letters Patent is hereby corrected as shown below:

<u>Title page,</u>
Item [30], Foreign Application Priority Data as follows:

-- [30]    Foreign Application Priority Data

May 24, 1999   (JP)    Japan ………………..11-144076 --.

Signed and Sealed this

Thirteenth Day of August, 2002

Attest:

Attesting Officer

JAMES E. ROGAN
*Director of the United States Patent and Trademark Office*